US011657094B2

(12) United States Patent
Moon et al.

(10) Patent No.: US 11,657,094 B2
(45) Date of Patent: May 23, 2023

(54) MEMORY GROUNDED CONVERSATIONAL REASONING AND QUESTION ANSWERING FOR ASSISTANT SYSTEMS

(71) Applicant: Meta Platforms Technologies, LLC, Menlo Park, CA (US)

(72) Inventors: Seungwhan Moon, Seattle, WA (US); Pararth Paresh Shah, Sunnyvale, CA (US); Anuj Kumar, Santa Clara, CA (US); Rajen Subba, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 735 days.

(21) Appl. No.: 16/552,559

(22) Filed: Aug. 27, 2019

(65) Prior Publication Data

US 2020/0410012 A1 Dec. 31, 2020

Related U.S. Application Data

(60) Provisional application No. 62/868,658, filed on Jun. 28, 2019.

(51) Int. Cl.
*G06N 3/04* (2023.01)
*G06F 16/9032* (2019.01)
(Continued)

(52) U.S. Cl.
CPC .... *G06F 16/90332* (2019.01); *G06F 16/9035* (2019.01); *G06N 3/042* (2023.01);
(Continued)

(58) Field of Classification Search
CPC ..... G06N 3/0427; G06N 3/0445; G06N 5/022
(Continued)

(56) References Cited

U.S. PATENT DOCUMENTS 7,124,123 B1 10/2006 Roskind
7,158,678 B2 1/2007 Nagel
(Continued)

FOREIGN PATENT DOCUMENTS

AU 2017203668 1/2018
EP 2530870 12/2012
(Continued)

OTHER PUBLICATIONS

Horzyk et al ("Integration of Semantic and Episodic Memories" 2017) (Year: 2017).*

(Continued)

*Primary Examiner* — Lut Wong
(74) *Attorney, Agent, or Firm* — Baker Botts L.L.P.

(57) ABSTRACT

In one embodiment, a method includes receiving a query from a user from a client system associated with the user, determining one or more initial memory slots based on the query, accessing a memory graph associated with the user which comprises a plurality of nodes and a plurality of edges connecting the nodes, and wherein one or more of the nodes correspond to one or more episodic memories of the user, respectively, and wherein each edge corresponds to a relationship between the connected nodes, selecting one or more candidate nodes from the memory graph by one or more machine-learning models based on the initial memory slots, generating a response based on the initial memory slots and episodic memories corresponding to the selected candidate nodes, and sending instructions for presenting the response to the client system in response to the query.

20 Claims, 13 Drawing Sheets

(51) Int. Cl.
*G06N 3/049* (2023.01)
*G06F 16/9035* (2019.01)
*G06N 20/00* (2019.01)
*G06N 3/084* (2023.01)
*G06N 5/022* (2023.01)
*G06N 3/042* (2023.01)
*G06N 3/044* (2023.01)

(52) U.S. Cl.
CPC ............ *G06N 3/044* (2023.01); *G06N 3/049* (2013.01); *G06N 3/084* (2013.01); *G06N 5/022* (2013.01); *G06N 20/00* (2019.01)

(58) Field of Classification Search
USPC .......................................................... 706/15
See application file for complete search history.

(56) References Cited

U.S. PATENT DOCUMENTS

| | | | |
|---|---|---|---|
| 7,397,912 | B2 | 7/2008 | Aasman |
| 7,853,551 | B1* | 12/2010 | Gill ....................... G06Q 10/06 706/55 |
| 8,027,451 | B2 | 9/2011 | Arendsen |
| 8,560,564 | B1 | 10/2013 | Hoelzle |
| 8,677,377 | B2 | 3/2014 | Cheyer |
| 8,935,192 | B1 | 1/2015 | Ventilla |
| 8,983,383 | B1 | 3/2015 | Haskin |
| 9,154,739 | B1 | 10/2015 | Nicolaou |
| 9,299,059 | B1 | 3/2016 | Marra |
| 9,304,736 | B1 | 4/2016 | Whiteley |
| 9,338,242 | B1 | 5/2016 | Suchland |
| 9,338,493 | B2 | 5/2016 | Van Os |
| 9,390,724 | B2 | 7/2016 | List |
| 9,418,658 | B1 | 8/2016 | David |
| 9,472,206 | B2 | 10/2016 | Ady |
| 9,479,931 | B2 | 10/2016 | Ortiz, Jr. |
| 9,576,574 | B2 | 2/2017 | van Os |
| 9,659,577 | B1 | 5/2017 | Langhammer |
| 9,747,895 | B1 | 8/2017 | Jansche |
| 9,792,281 | B2 | 10/2017 | Sarikaya |
| 9,858,925 | B2 | 1/2018 | Gruber |
| 9,865,260 | B1 | 1/2018 | Vuskovic |
| 9,875,233 | B1 | 1/2018 | Tomkins |
| 9,875,741 | B2 | 1/2018 | Gelfenbeyn |
| 9,886,953 | B2 | 2/2018 | Lemay |
| 9,990,591 | B2 | 6/2018 | Gelfenbeyn |
| 10,042,032 | B2 | 8/2018 | Scott |
| 10,134,395 | B2 | 11/2018 | Typrin |
| 10,199,051 | B2 | 2/2019 | Binder |
| 10,241,752 | B2 | 3/2019 | Lemay |
| 10,276,170 | B2 | 4/2019 | Gruber |
| 10,325,210 | B2* | 6/2019 | Sanchez ................... G06N 5/04 |
| 2008/0240379 | A1 | 10/2008 | Maislos |
| 2012/0246191 | A1 | 9/2012 | Xiong |
| 2012/0265528 | A1 | 10/2012 | Gruber |
| 2013/0268839 | A1 | 10/2013 | Lefebvre |
| 2013/0275138 | A1 | 10/2013 | Gruber |
| 2013/0275164 | A1 | 10/2013 | Gruber |
| 2014/0164506 | A1 | 6/2014 | Tesch |
| 2015/0179168 | A1 | 6/2015 | Hakkani-Tur |
| 2016/0225370 | A1 | 8/2016 | Kannan |
| 2016/0255082 | A1 | 9/2016 | Rathod |
| 2016/0328096 | A1 | 11/2016 | Tran |
| 2016/0378849 | A1 | 12/2016 | Myslinski |
| 2016/0378861 | A1 | 12/2016 | Eledath |
| 2017/0024645 | A1* | 1/2017 | Socher ..................... G06N 3/08 |
| 2017/0091168 | A1 | 3/2017 | Bellegarda |
| 2017/0132019 | A1 | 5/2017 | Karashchuk |
| 2017/0353469 | A1 | 12/2017 | Selekman |
| 2017/0359707 | A1 | 12/2017 | Diaconu |
| 2018/0018562 | A1 | 1/2018 | Jung |
| 2018/0018987 | A1 | 1/2018 | Zass |
| 2018/0082184 | A1* | 3/2018 | Guo ....................... G06F 40/56 |
| 2018/0096071 | A1 | 4/2018 | Green |
| 2018/0096072 | A1 | 4/2018 | He |
| 2018/0107917 | A1 | 4/2018 | Hewavitharana |
| 2018/0150743 | A1* | 5/2018 | Ma ......................... G06N 3/084 |
| 2018/0189629 | A1 | 7/2018 | Yatziv |
| 2019/0042988 | A1 | 2/2019 | Brown |
| 2019/0080698 | A1 | 3/2019 | Miller |
| 2019/0156206 | A1 | 5/2019 | Graham |

FOREIGN PATENT DOCUMENTS

| | | |
|---|---|---|
| EP | 3122001 | 1/2017 |
| WO | WO 2012/116241 | 8/2012 |
| WO | WO 2016/195739 | 12/2016 |
| WO | WO 2017/053208 | 3/2017 |
| WO | WO 2017/116488 | 7/2017 |
| WO | WO 2019011824 A1 | 1/2019 |

OTHER PUBLICATIONS

Kim et al ("A Bi-LSTM memory network for end-to-end goal-oriented dialog learning" 2018) (Year: 2018).*
International Search Report and Written Opinion for International Application No. PCT/US2020/038768, dated Aug. 11, 2020.
Gao, et al., Neural Approaches to Conversational AI, arxiv.org, Cornell University Library, 201 Olin Library Cornell University Ithaca, NY 14853, Dec. 13, 2018, XP081433242, 96 pages.
U.S. Appl. No. 14/593,723, filed Jan. 9, 2015, Colin Patrick Treseler.
U.S. Appl. No. 15/808,638, filed Nov. 9, 2017, Ryan Brownhill.
U.S. Appl. No. 15/953,957, filed Apr. 16, 2018, Kemal El Moujahid.
U.S. Appl. No. 15/966,455, filed Apr. 30, 2018, Scott Martin.
U.S. Appl. No. 15/967,193, filed Apr. 30, 2018, David Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.

(56) References Cited

OTHER PUBLICATIONS

U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,634, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
Mari Ostendorf, et al.: Human Language Technology: Opportunities and Challenges, IEEE International Conference on Acoustics, Speech, and Signal Processing, Mar. 23, 2005.
Adam Poliak, et al.: Efficient, Compositional, Order-Sensitive n-gram Embeddings, Proceedings of the 15th Conference of the European Chapter of the Association for Computational Linguistics: vol. 2, Short Papers, pp. 503-508, Valencia, Spain, Apr. 3-7, 2017.
Chris Dyer, et al.: Recurrent Neural Network Grammars, Proceedings of NAACL-HLT 2016, pp. 199-209, San Diego, California, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-embedding-with-word2vec-and-fasttext-a209c1d3e12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv:1812.00116, Dec. 1, 2018.
Turniški, Filip, et al. "Analysis of 3G and 4G download throughput in pedestrian zones." 2016 International Symposium ELMAR. IEEE, Sep. 12, 2016.
Dubin, Ran, et al. "Adaptation Logic for HTTP Dynamic Adaptive Streaming using Geo-Predictive Crowdsourcing." arXiv preprint arXiv:1602.02030 (Feb. 5, 2016).
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-eeasier-productive-expressive/, May 19, 2016.

Agrawal, Aishwarya, et al. "VQA: Visual Question Answering." International Journal of Computer Vision 1.123 (Oct. 27, 2016): 4-31.
Bast, Hannah, et al. "Easy access to the freebase dataset." Proceedings of the 23rd International Conference on World Wide Web. ACM, Apr. 7-11, 2014.
Bauer, Lisa, Yicheng Wang, and Mohit Bansal. "Commonsense for generative multi-hop question answering tasks." arXiv preprint arXiv:1809.06309 (2018).
Bordes, Antoine, et al. "Large-scale simple question answering with memory networks." arXiv preprint arXiv:1506.02075 (Jun. 5, 2015).
Bordes, Antoine, et al. "Translating embeddings for modeling multi-relational data." Advances in neural information processing systems. Dec. 5, 2013.
Bordes, Antoine, Y-Lan Boureau, and Jason Weston. "Learning end-to-end goal oriented dialog." arXiv preprint arXiv:1605.07683 (2016).
Choi, Eunsol, et al. "Quac: Question answering in context." arXiv preprint arXiv:1808.07036 (Aug. 28, 2018).
Clark, Peter, et al. "Think you have solved question answering? try arc, the ai2 reasoning challenge." arXiv preprint arXiv: 1803.05457 (Mar. 14, 2018).
Conneau, Alexis, et al. "Supervised Learning of Universal Sentence Representations from Natural Language Inference Data." (Jul. 8, 2018).
Dalton, Jeffrey, Victor Ajayi, and Richard Main. "Vote Goat: Conversational Movie Recommendation." The 41st International ACM SIGIR Conference on Research & Development in Information Retrieval. ACM, May 15, 2018.
De Vries, Harm, et al. "Talk the walk: Navigating new york city through grounded dialogue." arXiv preprint arXiv:1807.03367 (Dec. 23, 2018).
Dubey, Mohnish, et al. "Earl: Joint entity and relation linking for question answering over knowledge graphs." International Semantic Web Conference. Springer, Cham, Jun. 25, 2018.
Duchi, John, Elad Hazan, and Yoram Singer. "Adaptive subgradient methods for online learning and stochastic optimization." Journal of Machine Learning Research 12.Jul. 11, 2011: 2121-2159.
Hudson, Drew A., and Christopher D. Manning. "Gqa: A new dataset for real-world visual reasoning and compositional question answering." Proceedings of the IEEE Conference on Computer Vision and Pattern Recognition. May 10, 2019.
Jiang, Lu, et al. "Memexqa: Visual memex question answering." arXiv preprint arXiv:1708.01336 (Aug. 4, 2017).
Jung, Hyunwoo, et al. "Learning What to Remember: Long-term Episodic Memory Networks for Learning from Streaming Data." arXiv preprint arXiv:1812.04227 (Dec. 11, 2018).
Kottur, Satwik, et al. "Visual coreference resolution in visual dialog using neural module networks." Proceedings of the European Conference on Computer Vision (ECCV). Sep. 8-14, 2018.
Kumar, Ankit, et al. "Ask me anything: Dynamic memory networks for natural language processing." International conference on machine learning. Jan. 6, 2016.
Li, Jiwei, et al. "A persona-based neural conversation model." arXiv preprint arXiv:1603.06155 (Jun. 8, 2016).
Pennington, Jeffrey, Richard Socher, and Christopher Manning. "Glove: Global vectors for word representation." Proceedings of the 2014 conference on empirical methods in natural language processing (EMNLP). Oct. 25-29, 2014.
Rajpurkar, Pranav, et al. "Squad: 100,000+ questions for machine comprehension of text." arXiv preprint arXiv:1606.05250 (Oct. 11, 2016).
Rajpurkar, Pranav, Robin Jia, and Percy Liang. "Know What You Don't Know: Unanswerable Questions for SQuAD." arXiv preprint arXiv:1806.03822 (Jun. 11, 2018).
Reddy, Siva, Danqi Chen, and Christopher D. Manning. "Coqa: A conversational question answering challenge." Transactions of the Association for Computational Linguistics 7 (2019): 249-266, May 29, 2019.
Seo, Minjoon, et al. "Bidirectional attention flow for machine comprehension." arXiv preprint arXiv:1611.01603 (2016).

(56) References Cited

OTHER PUBLICATIONS

Sukhbaatar, Sainbayar, Jason Weston, and Rob Fergus. "End-to-end memory networks." Advances in neural information processing systems. Nov. 24, 2015.
Tran, Ke, Arianna Bisazza, and Christof Monz. "Recurrent memory networks for language modeling." arXiv preprint arXiv:1601.01272 (Apr. 22, 2016).
Wang, Peng, et al. "Fvqa: Fact-based visual question answering." IEEE transactions on pattern analysis and machine intelligence 40.10 (2018): 2413-2427.
Welbl, Johannes, Pontus Stenetorp, and Sebastian Riedel. "Constructing datasets for multi-hop reading comprehension across documents." Transactions of the Association for Computational Linguistics 6 (Jun. 11, 2018): 287-302.
Salem, Yasser, Jun Hong, and Weiru Liu. "History-guided conversational recommendation." Proceedings of the 23rd International Conference on World Wide Web. ACM, Apr. 7-11, 2014.
Sun, Yueming, and Yi Zhang. "Conversational recommender system." The 41st International ACM SIGIR Conference on Research & Development in Information Retrieval. ACM, Jul. 8-12, 2018.
Wei, Wei, et al. "Airdialogue: An environment for goal-oriented dialogue research." Proceedings of the 2018 Conference on Empirical Methods in Natural Language Processing. Nov. 4, 2018.
Weston, Jason, Sumit Chopra, and Antoine Bordes. "Memory networks." arXiv preprint arXiv:1410.3916 (2014).
Williams, Jason D., Kavosh Asadi, and Geoffrey Zweig. "Hybrid code networks: practical and efficient end-to-end dialog control with supervised and reinforcement learning." arXiv preprint arXiv:1702.03274 (Apr. 24, 2017).
Wu, Qi, et al. "Image Captioning and Visual Question Answering Based on Attributes and External Knowledge." arXiv preprint arXiv:1603.02814 (Dec. 16, 2016).
Xu, Kun, et al. "Question answering on freebase via relation extraction and textual evidence." arXiv preprint arXiv:1603.00957 (Jun. 9, 2016).
Yang, Zhilin, et al. "Hotpotqa: A dataset for diverse, explainable multi-hop question answering." arXiv preprint arXiv:1809.09600 (Sep. 25, 2018).
Yin, Wenpeng, et al. "Simple question answering by attentive convolutional neural network." arXiv preprint arXiv:1606.03391 (Oct. 11, 2016).
Zhang, Saizheng, et al. "Personalizing Dialogue Agents: I have a dog, do you have pets too?." arXiv preprint arXiv:1801.07243 (Sep. 25, 2018).
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.6-1222, dated Feb. 5, 2019.
European search report received from the European Patent Office for European Patent Application No. 19155094.6-1218, dated Mar. 19, 2019.

\* cited by examiner

Memory Graph

Dialog

Photo Memories

FIG. 6A

- 600
- 604
  - 215 — ASSISTANT: Hi! I can help you walk down your memory graph. — 606
  - 215 — YOU: When did I last go skiing last? — 608
  - 215 — ASSISTANT: It was March 12, 2017 in Austria. — 610
- 602
  - 612

FIG. 6B

- 600
- 604
  - 215 — ASSISTANT: Hi! I can help you walk down your memory graph. — 606
  - 215 — YOU: When did I last go skiing last? — 608
  - 215 — ASSISTANT: It was March 12, 2017 in Austria. — 610
  - 215 — YOU: Who else was there? — 614
  - 215 — ASSISTANT: Mariah was there. You and Mariah also went skiing 4 other times. Would you like to see those photos? — 616
- 602
  - 618

MEMORY GROUNDED CONVERSATIONAL REASONING AND QUESTION ANSWERING FOR ASSISTANT SYSTEMS

PRIORITY

This application claims the benefit, under 35 U.S.C. § 119(e), of U.S. Provisional Patent Application No. 62/868,658, filed 28 Jun. 2019, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may use episodic memory question answering (QA) for the task of answering personal user questions grounded on a memory graph (MG), where episodic memories and related entity nodes are connected via relational edges. A new benchmark dataset was created first by generating synthetic memory graphs with simulated attributes, and by composing 100,000 QA pairs for the generated MG with bootstrapped scripts and manual annotations. Though operating on the synthetic memory graphs, the method may be trained and applied to real-world user memory data (e.g. photo albums, etc.). To address the unique challenges for the task, the method may use memory graph networks (MGN), a novel extension of memory networks to enable dynamic expansion of memory slots through graph traversals, thus being able to answer queries in which contexts from multiple linked episodes and external knowledge are required. The method may further use an episodic memory QA net with multiple module networks to effectively handle various question types. Empirical results show significant improvement over the state-of-the-art QA baselines in top-k answer prediction accuracy in the task. The method may also generate a graph walk path for each predicted answer, providing a natural way to explain its QA reasoning. As a result, the method may enable the assistant system with the following conversational capabilities: 1) reactive memory QA, in which the assistant system responds to user queries to recall specific attributes of past episodic memories, 2) proactive memory reference, in which the assistant system surfaces relevant past memories to make conversations more engaging and natural. Although this disclosure describes particular question answering via a particular system in a particular manner, this disclosure contemplates any suitable question answering via any suitable system in any suitable manner.

In particular embodiments, the assistant system may receive, from a client system associated with a user, a query from the user. The assistant system may then determine, based on the query, one or more initial memory slots. In particular embodiments, the assistant system may access a memory graph associated with the user. The memory graph may comprise a plurality of nodes and a plurality of edges connecting the nodes. In particular embodiments, one or more of the nodes may correspond to one or more episodic memories of the user, respectively. Each edge may correspond to a relationship between the connected nodes. In particular embodiments, the assistant system may select, by one or more machine-learning models based on the initial memory slots, one or more candidate nodes from the memory graph. The assistant system may then generate a response based on the initial memory slots and episodic memories corresponding to the selected candidate nodes. In particular embodiments, the assistant system may further send, to the client system in response to the query, instructions for presenting the response.

Certain technical challenges exist for achieving memory grounded conversational reasoning. One technical challenge may include disambiguating ambiguous and incomplete descriptions of reference memory without extensive candidate memory generation. The solutions presented by the embodiments disclosed herein to address the above challenge may be storing graph nodes as memory slots and allowing the network to dynamically expand memory slots through graph traversals as graph traversals may only identify the most relevant memory slots stored in a readily available memory graph to accurately determine reference memory. Another technical challenge may include target memory being only indirectly linked to reference memory or entities. The solution presented by the embodiments disclosed herein to address this challenge may be building a synthetic memory graph generator to create multiple episodic memory graph nodes connected with real entities as episodic memory graph nodes are connected with real entities in the memory graph. Another technical challenge may include queries being not confined to retrieval tasks but including various types of questions. The solution presented by the embodiments disclosed herein to address this challenge may be implementing multiple sub-module nets as these sub-module nets can be combined in a variety of ways to deal with various types of questions.

Certain embodiments disclosed herein may provide one or more technical advantages. A technical advantage of the embodiments may include generating more natural and human-like responses as the response is generated based on both the user's query and relevant episodic memory of the user. Another technical advantage of the embodiments may include providing a natural way to explain how and why a response is generated because the walk paths on the memory graph are easy to interpret. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6A illustrates an example user interface showing dialog with a user accompanied by a photo memory.

FIG. 6B illustrates an example user interface showing dialog with a user accompanied by another photo memory.

DESCRIPTION OF EXAMPLE EMBODIMENTS

System Overview

Figure 1:
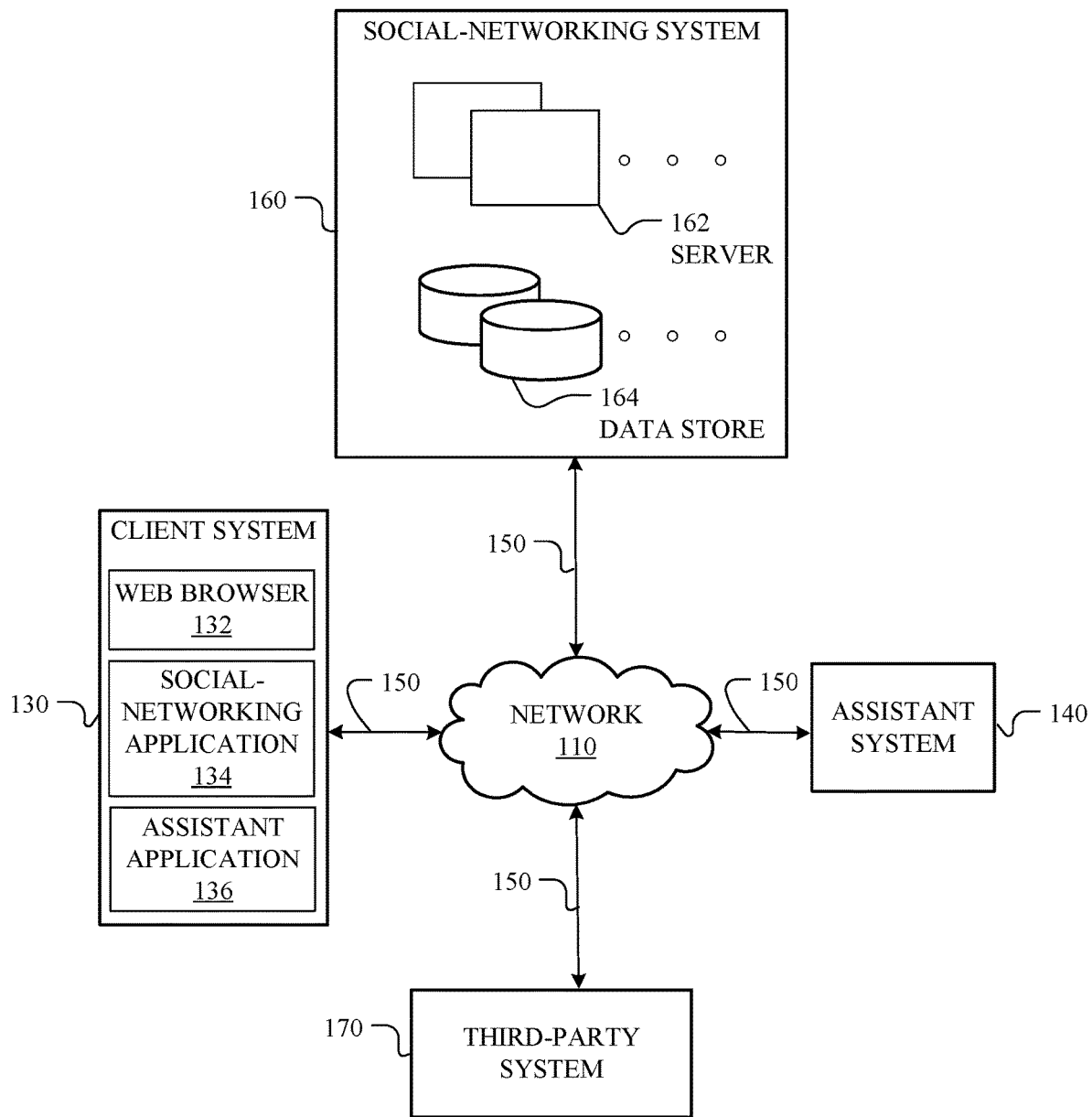
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application No. 29/631910, filed 3 Jan. 2018, U.S. Design patent application No. 29/631747, filed 2 Jan. 2018, U.S. Design patent application No. 29/631913, filed 3 Jan. 2018, and U.S. Design patent application No. 29/631914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
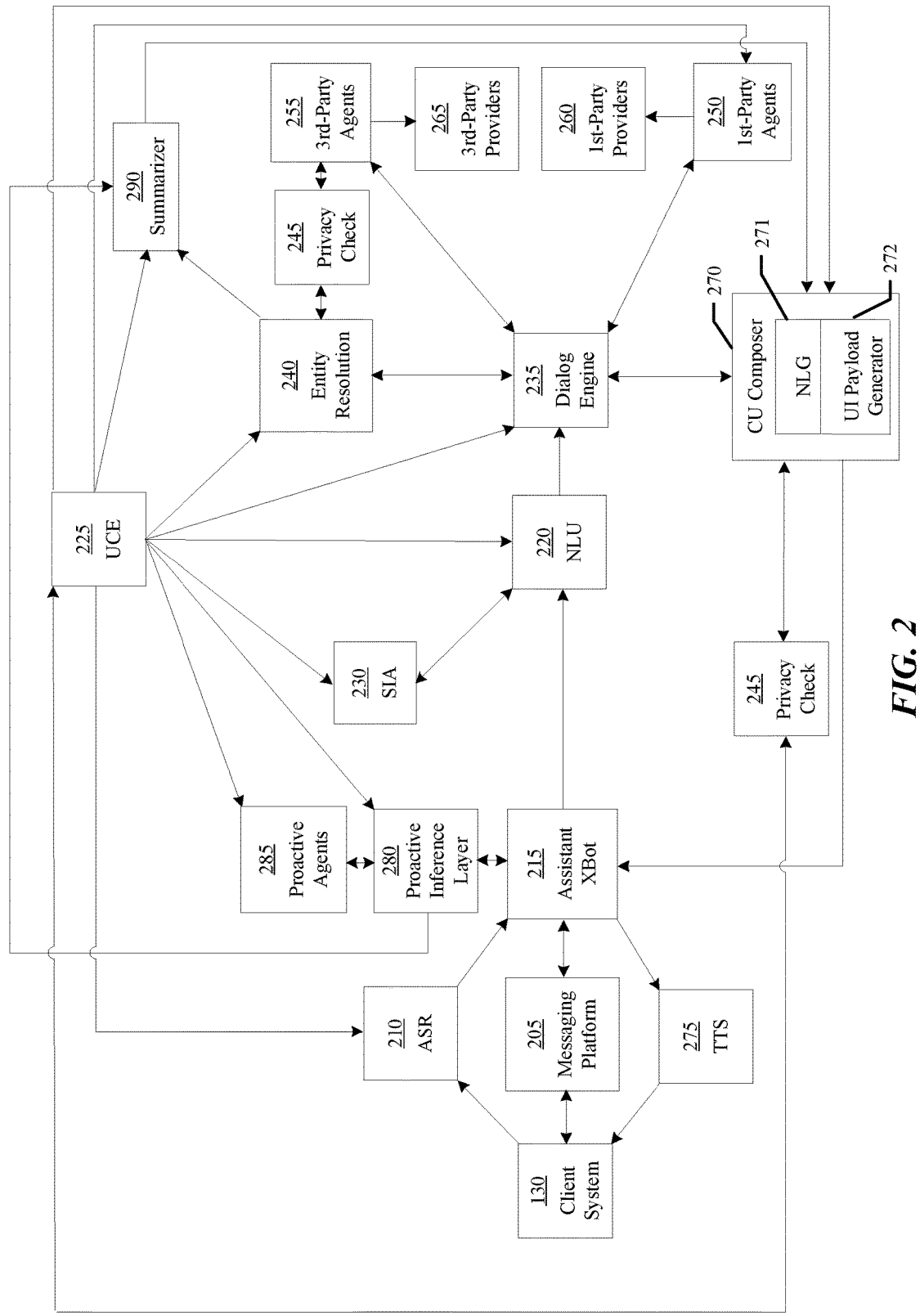
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an automatic speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator (SIA) 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of pre-defined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the pre-defined taxonomy, e.g., for the input "Play Beethoven's 5th," the NLU module 220 may classify the input as having the intent [IN:play_music]. In particular embodiments, a domain may be conceptually a namespace for a set of intents, e.g., music. A slot may be a named sub-string with the user input, representing a basic semantic entity. For example, a slot for "pizza" may be [SL:dish]. In particular embodiments, a set of valid or expected named slots may be conditioned on the classified intent. As an example and not by way of limitation, for [IN:play_music], a slot may be [SL:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the coffee shop". The NLU module 220 may identify the particular Starbucks that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., Facebook, online encyclopedias, movie review sources, media databases, and entertainment content sources), and then deduped, resolved, and fused to generate the single unique record for the knowledge graph. The entity may be associated with a space attribute value which indicates the genre of the movie "The Martian" (2015). More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network (Messenger, Instagram)). In particular embodiments, third-party agents 255 may comprise external agents that the assistant system 140 has no control over (e.g., third-party online music application agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k,c,u,d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes a particular band and the proactive agent 285 may generate a recommendation of the particular band's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
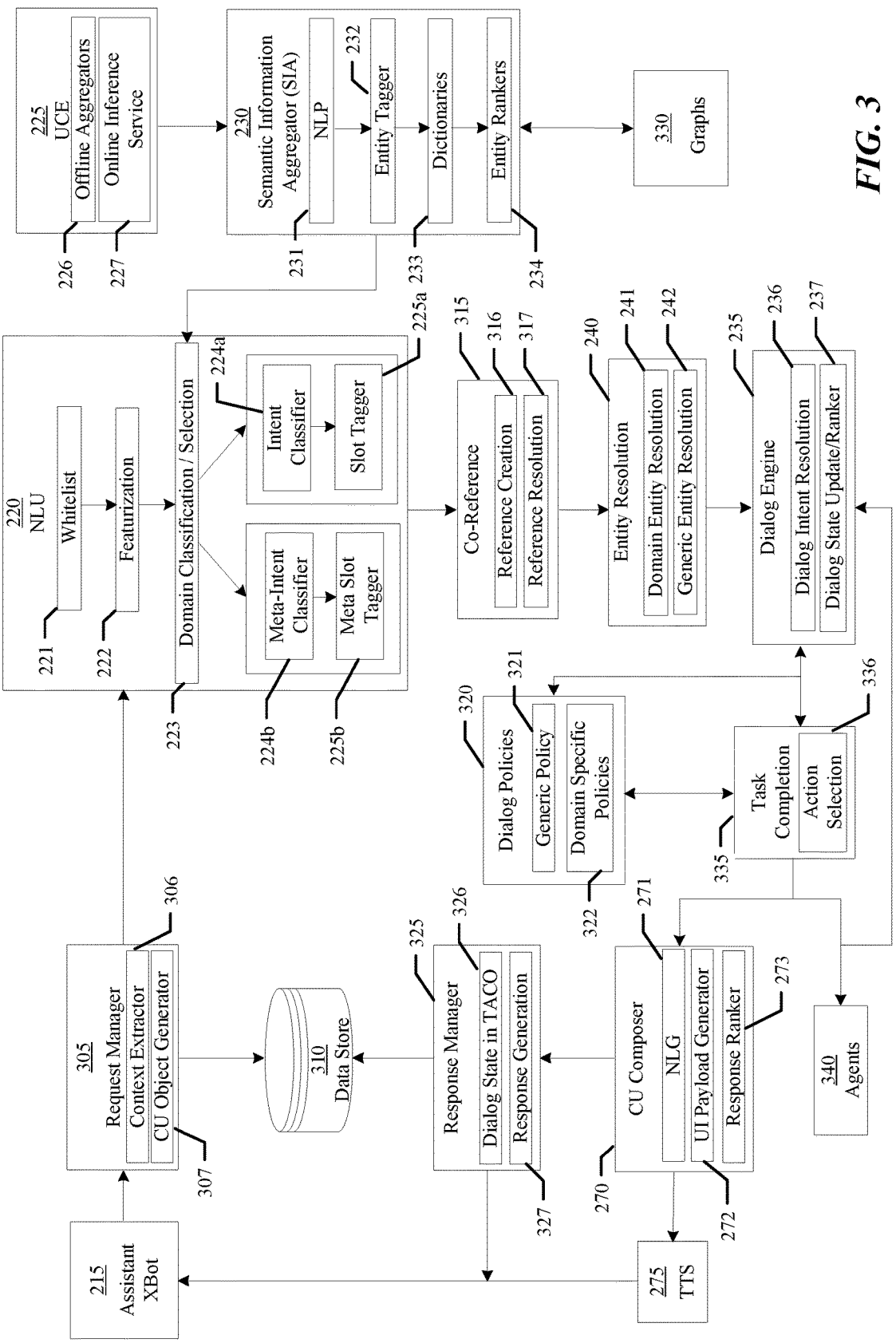
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step 224*a*, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224*b*, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225*a*, the NLU module 220 may use a slot tagger to annotate one or more slots associated with the user request. In particular embodiments, the slot tagger may annotate the one or more slots for the n-grams of the user request. At step 225*b*, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, Instagram posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item to which the user request refers. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest grocery store and direct me there". The co-reference module 315 may interpret "there" as "the nearest grocery store". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 242 may resolve the referenced brand of electric car as vehicle and the domain entity resolution 241 may resolve the referenced brand of electric car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args:{artist: "Madonna"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, actions with parameters, or rendered images or videos that can be displayed in a VR headset or AR smart glass. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Memory Grounded Conversational Reasoning and Question Answering for Assistant Systems In particular embodiments, the assistant system 140 may use episodic memory question answering (QA) for the task of answering personal user questions grounded on a memory graph (MG), where episodic memories and related entity nodes are connected via relational edges. A new benchmark dataset was created first by generating synthetic memory graphs with simulated attributes, and by composing 100,000 QA pairs for the generated MG with bootstrapped scripts and manual annotations. Though operating on the synthetic memory graphs, the method may be trained and applied to real-world user memory data (e.g. photo albums, etc.). To address the unique challenges for the task, the method may use memory graph networks (MGN), a novel extension of memory networks to enable dynamic expansion of memory slots through graph traversals, thus being able to answer queries in which contexts from multiple linked episodes and external knowledge are required. The method may further use an episodic memory QA net with multiple module networks to effectively handle various question types. Empirical results show significant improvement over the state-of-the-art QA baselines in top-k answer prediction accuracy in the task. The method may also generate a graph walk path for each predicted answer, providing a natural way to explain its QA reasoning. As a result, the method may enable the assistant system 140 with the following conversational capabilities: 1) reactive memory QA, in which the assistant system 140 responds to user queries to recall specific attributes of past episodic memories, 2) proactive memory reference, in which the assistant system 140 surfaces relevant past memories to make conversations more engaging and natural. Although this disclosure describes particular question answering via a particular system in a particular manner, this disclosure contemplates any suitable question answering via any suitable system in any suitable manner.

In particular embodiments, the assistant system 140 may receive, from a client system 130 associated with a user, a query from the user. The assistant system 140 may then determine, based on the query, one or more initial memory slots. In particular embodiments, the assistant system 140 may access a memory graph associated with the user. The memory graph may comprise a plurality of nodes and a plurality of edges connecting the nodes. In particular embodiments, one or more of the nodes may correspond to one or more episodic memories of the user, respectively. Each edge may correspond to a relationship between the connected nodes. In particular embodiments, the assistant system 140 may select, by one or more machine-learning models based on the initial memory slots, one or more candidate nodes from the memory graph. The assistant system 140 may then generate a response based on the initial memory slots and episodic memories corresponding to the selected candidate nodes. In particular embodiments, the assistant system 140 may further send, to the client system 130 in response to the query, instructions for presenting the response.

Introduction

The task of question and answering (QA) has been extensively studied, where most of the existing applications and datasets have been focused on the fact retrieval task from a large-scale knowledge graph (KG) (Bordes et al., 2015), or machine reading comprehension (MRC) approaches given relatively small sets of unstructured text (Rajpurkar et al., 2018). The embodiments disclosed herein introduce the new task and dataset for episodic memory QA, in which the model answers personal and retrospective questions based on memory graphs (MG), where each episodic memory and its related entities (e.g. knowledge graph (KG) entities, participants, . . . ) are represented as the nodes connected via corresponding edges. In particular embodiments, the memory graph may be built based on a knowledge graph comprising a plurality of nodes corresponding to a plurality of entities, respectively. The plurality of nodes of the memory graph may comprise a plurality of nodes corresponding to a plurality of entities from the knowledge graph and a plurality of nodes corresponding to a plurality of episodic memories of the user. In the last few decades, people have been storing an increasing fraction of their life's memories in the form of digital multimedia, e.g. photos, videos and textual posts. Retrieving one's memories from these memory banks and reminiscing about events from one's personal and professional life is a prevalent desire among many users and also helpful for question and answering.

Figure 4:
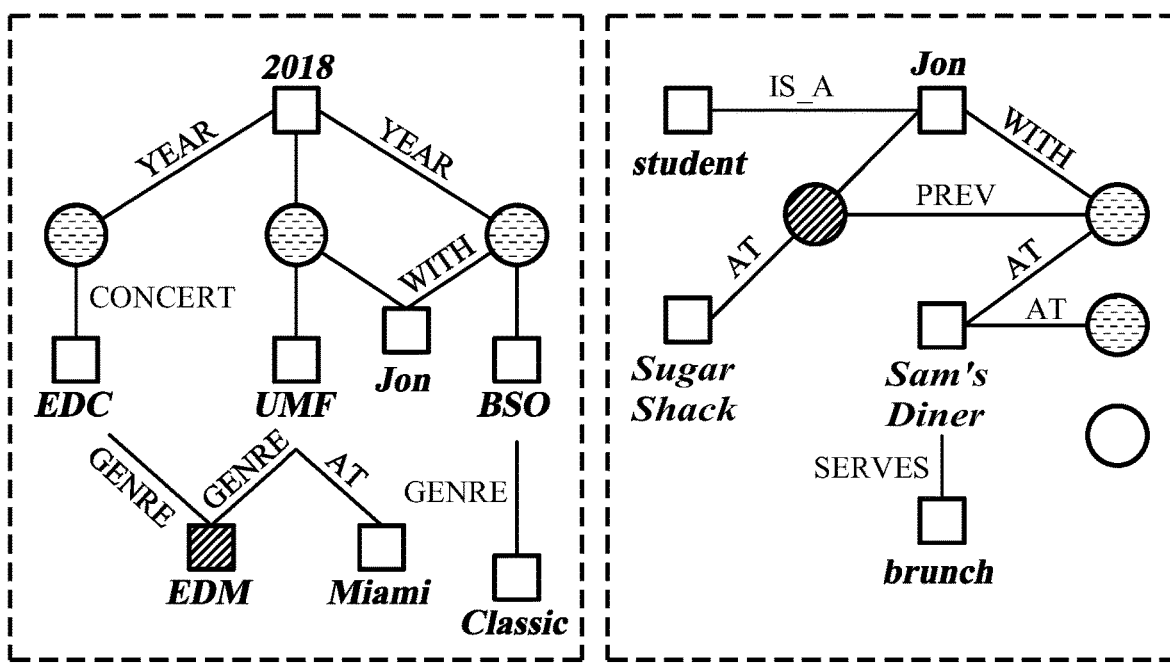
FIG. 4 illustrates example episodic memory question answering with user queries and memory graphs with knowledge graph entities.

FIG. 4 illustrates example episodic memory question answering 400 with user queries and memory graphs with knowledge graph entities. Relevant memory nodes are provided as initial memory slots via graph search lookup. The memory graph network walks from the initial nodes to at-tend to relevant contexts and expands the memory slots when necessary. In particular embodiments, the one or more candidate nodes may be selected from the one or more nodes corresponding to the one or more episodic memories of the user. The main QA model takes these graph traversal paths and expanded memory slots as input and predicts correct answers via multiple module networks (e.g. COUNT, CHOOSE, etc.). Examples of such queries include "Where did we go after we had brunch with Jon?", "How many times did I go to jazz concerts last year?", etc. For episodic memory QA, a machine has to understand the contexts of a question and navigate multiple MG episode nodes as well as KG nodes to gather comprehensive information to match the query requirement. In other words, the query may be associated with a context and selecting the one or more candidate nodes may be further based on the context associated with the query. In FIG. 4, a user may submit a query 402 which is "how many times did I go to an EDM concert last year?" The conversational system may first identify the initial memory slots 404. The conversational system may then use one or more machine-learning models to walk within the memory graphs 406 which comprises memory nodes 408 and knowledge graph nodes 410. The one or more machine-learning models may comprise at least a long-short term memory (LSTM) model. In particular embodiments, the memory graphs 406 comprising knowledge graph nodes 410 indicate that one or more nodes of the plurality of nodes may correspond to one or more entities, respectively. The conversational system may then determine some activated nodes after expansion 412. Based on the initial memory slots 404 and activated nodes after expansion 412, the conversational system may generate an answer 414 as "two". The user may submit another query 416 which is "where did we go after we had brunch with Jon last weekend?" The conversational system may process the query using similar steps as aforementioned to generate an answer 418 as "Sugar Shack".

While the ability of querying a personal database could lead to many potential applications, previous work in this domain (Jiang et al., 2018) is limited due to the lack of a large-scale dataset and a unique set of challenges unseen in other tasks: For example, it is observed that 1) memory QA queries often include ambiguous and incomplete descriptions of reference memory (as opposed to many conventional fact QAs with unambiguous mentions, e.g. "Who painted the Mona Lisa?"), hence requiring extensive candidate memory generation. Another challenge observed may be the case where 2) target memory is only indirectly linked to reference memory or entities (e.g. "Where did we go after brunch?"), which makes the conventional information retrieval (IR) approaches for generating answer candidates ineffective. In addition, 3) queries are not confined to retrieval tasks, but include various types of questions such as counting, set comparing, etc., many of which remain unsolved or not considered in many QA tasks.

The embodiments disclosed herein present a conversational system for episodic memory QA. The presented conversational system may additionally provide a natural interface for retrieving and browsing through one's memories. Traditionally, the interfaces to access these memories are either (i) keyword-based search systems which demand specific keyword combinations to identify and retrieve the correct memories, or (ii) catalog based browsing systems that allow scrolling through memories across a single dimension, most commonly, time of creation. However, the embodiments disclosed herein posit that a more natural way of interacting with one's memories is through a flexible interface that can support fuzzy queries by referencing memories through various attributes, such as events, people, locations or activities associated with them, and can enable the user to explore other relevant memories connected through one of many dimensions e.g. same group of people, same location, etc., thereby not being restricted to browsing only temporally adjacent memories. The system supports conversational QA capability for open-ended querying of memories, and also supports the ability to proactively surface related memories that the user would naturally be interested in consuming. An important element of such an open-ended dialog system is its ability to ground conversations with past memories of users, making the interactions more personal and engaging. In particular embodiments, the response may comprise one or more of a content file associated with the initial memory slots and episodic memories corresponding to the selected candidate nodes. As an example and not by way of limitation, the content file may comprise one or more of textual content, an image, a video clip, or an audio clip.

Figure 5B:
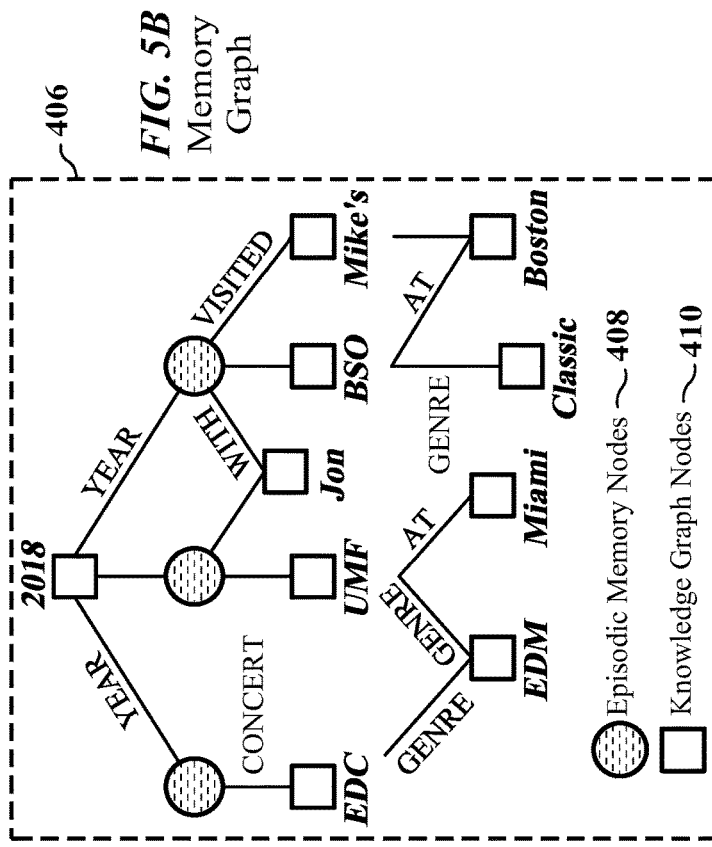
FIG. 5B illustrates an example memory graph in which nodes relevant to an example dialog are identified.
Figure 5A:
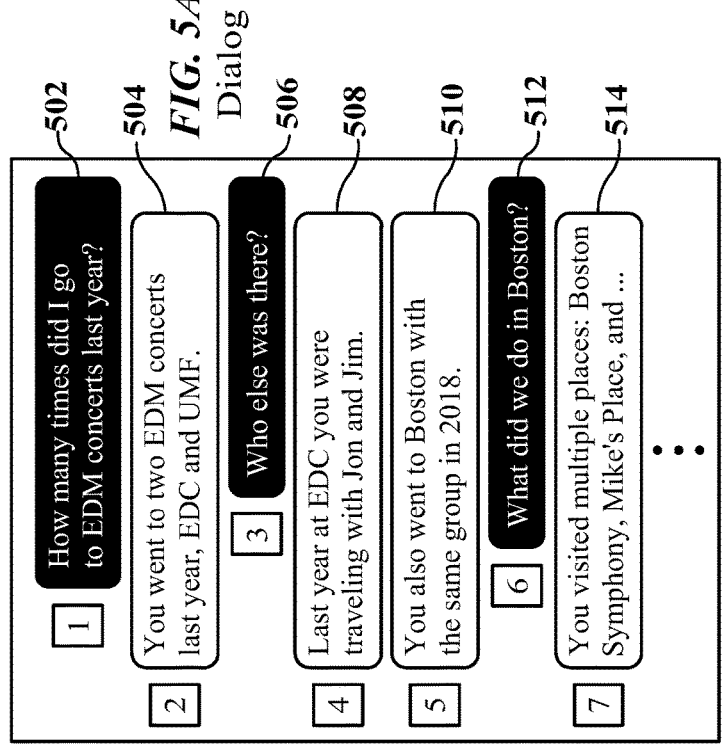
FIG. 5A illustrates an example dialog between a user and the conversational system.
Figure 5C:
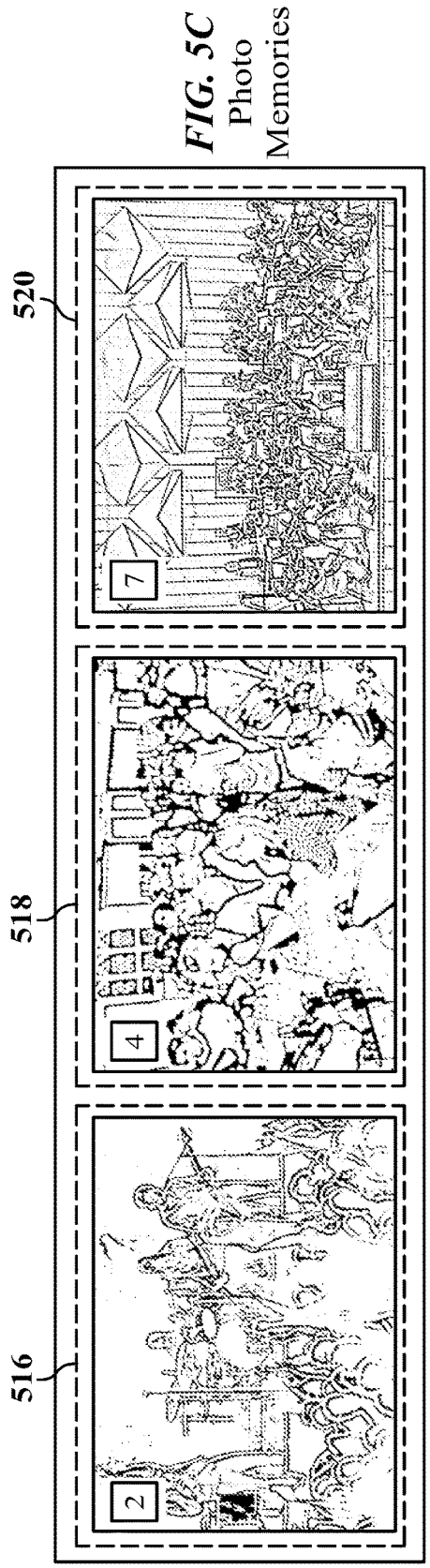
FIG. 5C illustrate example photo memories relevant to an example dialog.

FIGS. 5A-5C illustrate an example interaction supported by the conversational system, spanning multiple episodic memories that are represented as a memory graph composed of memory nodes and related entity nodes connected via relational edges. In particular embodiments, the response may be presented in a user interface comprising one or more of a media section or a chat section. The media section may surface the image or video clip and the chat section may surface the textual content. FIG. 5A illustrates an example dialog between a user and the conversational system. FIG. 5B illustrates an example memory graph in which nodes relevant to an example dialog are identified. FIG. 5C illustrates example photo memories relevant to an example dialog. In FIG. 5A, a user may submit a query 502 "how many times did I go to EDM concerts last year?" The conversational system may access a memory graph 406 comprising episodic memory nodes 408 and knowledge graph nodes 410 as illustrated in FIG. 5B. Based on the accessing and one or more machine-learning models, the conversational system may generate an answer 504 as "you went to two EDM concerts last year, EDC and UMF." The user may further ask a question 506 "who else was there?" The conversational system may generate a first response 508 as "last year at EDC, you were traveling with Jon and Jim." The conversational system may further generate a second response 510 as "you also went to Boston with the same group in 2018." The user may ask an additional question 512 which is "what did we do in Boston?" The conversational system may respond with an answer 514 which is "you visited multiple places: Boston Symphony, Mike's Place, and . . . " As displayed in FIG. 5C, besides generating textual responses, the conversational system may present photo memories. For example, photo 516 corresponds to the answer 504; photo 518 corresponds to the response 508; and photo 520 corresponds to the answer 514. The example interaction shows three key novel features of the conversational system: 1) the ability of querying a personal database to answer a user query (memory recall QA), 2) surfacing photos most relevant to the dialog, and 3) identifying other memories to surface that are relevant to conversational contexts, resulting in increased engagement and coherent interactions.

In particular embodiments, the conversational system may comprise several components. First, the system may comprise a memory graph networks (MGN) model, which learns natural graph paths among episodic memory nodes, conditioned over dialog contexts. While memory networks have successfully been used in QA applications, typical limitations are that memory slots are limited to the fixed number of slots, often in sentence or bag-of-symbols forms. The MGN model disclosed herein extends the popular memory networks by storing graph nodes as memory slots and by allowing the network to dynamically expand memory slots through graph traversals. Storing graph nodes as memory slots and allowing the network to dynamically expand memory slots through graph traversals may be effective solutions for addressing the technical challenge of disambiguating ambiguous and incomplete descriptions of reference memory without extensive candidate memory generation as graph traversals may only identify the most relevant memory slots stored in a readily available memory graph to accurately determine reference memory. Second, the QA module takes as input the user query utterance and infers a correct answer given candidate memory graph nodes activated with the MGN model. Specifically, the system may implement multiple sub-module nets such as CHOOSE, COUNT, etc., to support discrete reasoning questions that cannot be handled directly via graph networks. Implementing multiple sub-module nets may be an effective solution for addressing the technical challenge of queries being not confined to retrieval tasks but including various types of questions as these sub-module nets can be combined in a variety of ways to deal with various types of questions. Finally, the photo recommender module then uses the MGN graph node embeddings and the generated answer to retrieve the most relevant photos for each dialog response.

To bootstrap a large-scale dataset collection for Episodic Memory QA, the embodiments disclosed herein first build a synthetic memory graph generator, which creates multiple episodic memory graph nodes connected with real entities (e.g. locations, events, public entities) appearing on common-fact KGs. By creating a realistic memory graph that is synthetically generated, the embodiments disclosed herein may avoid the need for inferring memory graphs from other structured data (e.g. photo albums) which are often limited in size. In addition, building a synthetic memory graph generator to create multiple episodic memory graph nodes connected with real entities may be an effective solution for addressing the technical challenge of target memory being only indirectly linked to reference memory or entities as episodic memory graph nodes are connected with real entities in the memory graph. The embodiments disclosed herein further generate 100K QA pairs for each memory node with templates composed by human annotators, combined with 1K manual paraphrasing steps. In particular embodiments, generating the response may be further based on one or more language templates.

User Interface

The goal of the conversational system is to establish a natural user interface (UI) for interacting with memories. FIGS. 6A-6B illustrate an example user interface 600 of the conversational system. The user interface may comprise two main sections: the media section 602 (left) and the chat section 604 (right; highlighted yellow: assistant, blue: user). FIG. 6A illustrates an example user interface showing dialog with a user accompanied by a photo memory. FIG. 6B illustrates an example user interface showing dialog with a user accompanied by another photo memory. In the chat section 604 of FIG. 6A, an assistant xbot 215 may say "hi! I can help you walk down your memory graph" 606 to a user. The user may then ask a question 608 which is "when did I go skiing last?" The assistant xbot 215 may reply "it was Mar. 12, 2017 in Austria." 610. In addition, the conversational system may surface a photo 612 in the media section 602. The user may ask another question 614 which is "who else was there?" as displayed in FIG. 6B. The assistant xbot 215 may provide a response 616 which is "Mariah was there. You and Mariah also went skiing 4 other times in the past. Would you like to see those photos?" Meanwhile, the conversational system may surface a photo 618 with the user and Mariah in it. This is a simple yet powerful interface for interacting with memories, for the following reasons:

Flexible.

The UI enables natural language QA queries through text or voice input. This UI can be deployed in a desktop, web or mobile application, or on a connected home device like smart TVs. For each user memory recall query, the system provides a corresponding answer from the memory graph. In FIG. 6A, the user retrieves a memory related to an activity (skiing) through a textual question.

Visual.

The UI can display visual content connected to the memories, and allow for further queries into the content of the image or video. Authors' personal photos are used in the demonstration, attached with synthetically generated memory graphs.

Contextual.

The system keeps track of the conversational context within a user session, allowing the user to refer to entities present in the dialog or media. In FIG. 6B, the user refers to the event mentioned in the previous system response and ask a further question regarding who attended the event.

Proactive.

The system can insert conversational recommendations for exploring related memories based on the system's model of which memories are naturally interesting for users to consume in a particular context. In FIG. 6B, the system suggests the user to look for other memory instances that share the same activity and set of people. The system can make the suggestions more personalized by learning the sequences in which users like to explore memories, from the users' past sessions.

Method

Figure 7:
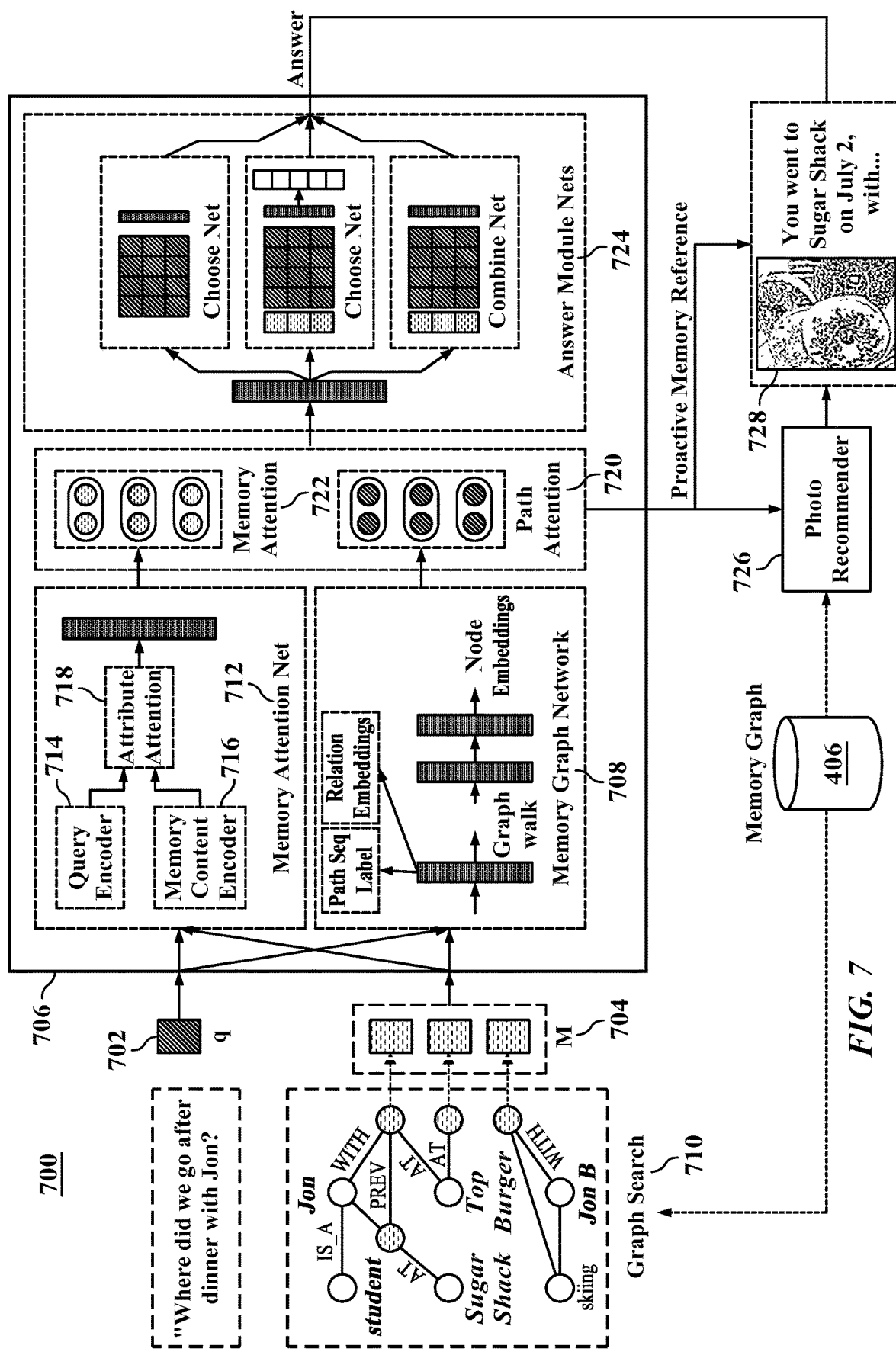
FIG. 7 illustrates an example architecture of an episodic memory question answering network.

FIG. 7 illustrates an example architecture 700 of an episodic memory question answering network. It also illustrates the model components that make up the episodic memory QA net. For an input query q 702, candidate memory nodes m={$m^{(k)}$} 704 are provided as input memory slots for the memory QA network 706. The memory graph network 708 then traverses the memory graph 406, in other words, performs a graph search 710, to expand the initial memory slots and activate other relevant entity and memory nodes based on the input queries 702. In particular embodiments, the assistant system 140 may determine relevance between the initial memory slots 404 and each of the plurality of nodes in the memory graph 406. Accordingly, selecting the one or more candidate nodes may be further based on the relevance. Meanwhile, the input query 702 is input to a memory attention net 712 which comprises a query encoder 714 and a memory content encoder 716. Within the memory attention net 712, an attribute attention 718 module may process the output from the query encoder 714 and the memory content encoder 716. The output of the memory graph network 708 is further processed by a memory path module 720 whereas the output of the memory attention net 712 is further processed by a memory attention module 722. The answer module networks 724 execute the predicted neural programs to decode answers given the memory graph network 708 outputs. The photo recommender 726 is then called to retrieve relevant photos (e.g., photos of the reference memory that includes the answer to a query). For example, a photo 728 associated with the text "you went to Sugar Shack on July 2, with . . . " is retrieved. The embodiments disclosed herein examine each module in detail and provide rationale about its formulation.

Input Module:

For a given query q, its relevant memory nodes m={$m^{(k)}$}$_{k=1}^{K}$ for slot size K are given as initial memory slots. At test time, relevant memory nodes can be retrieved from a graph search engine that measures textual similarity (e.g. n-gram TF-IDF) between its connected node contexts and query. The query encoder then encodes the input query with a language model, and the memory encoder encodes each memory slot for both structural and semantic properties of each memory.

Figure 8:
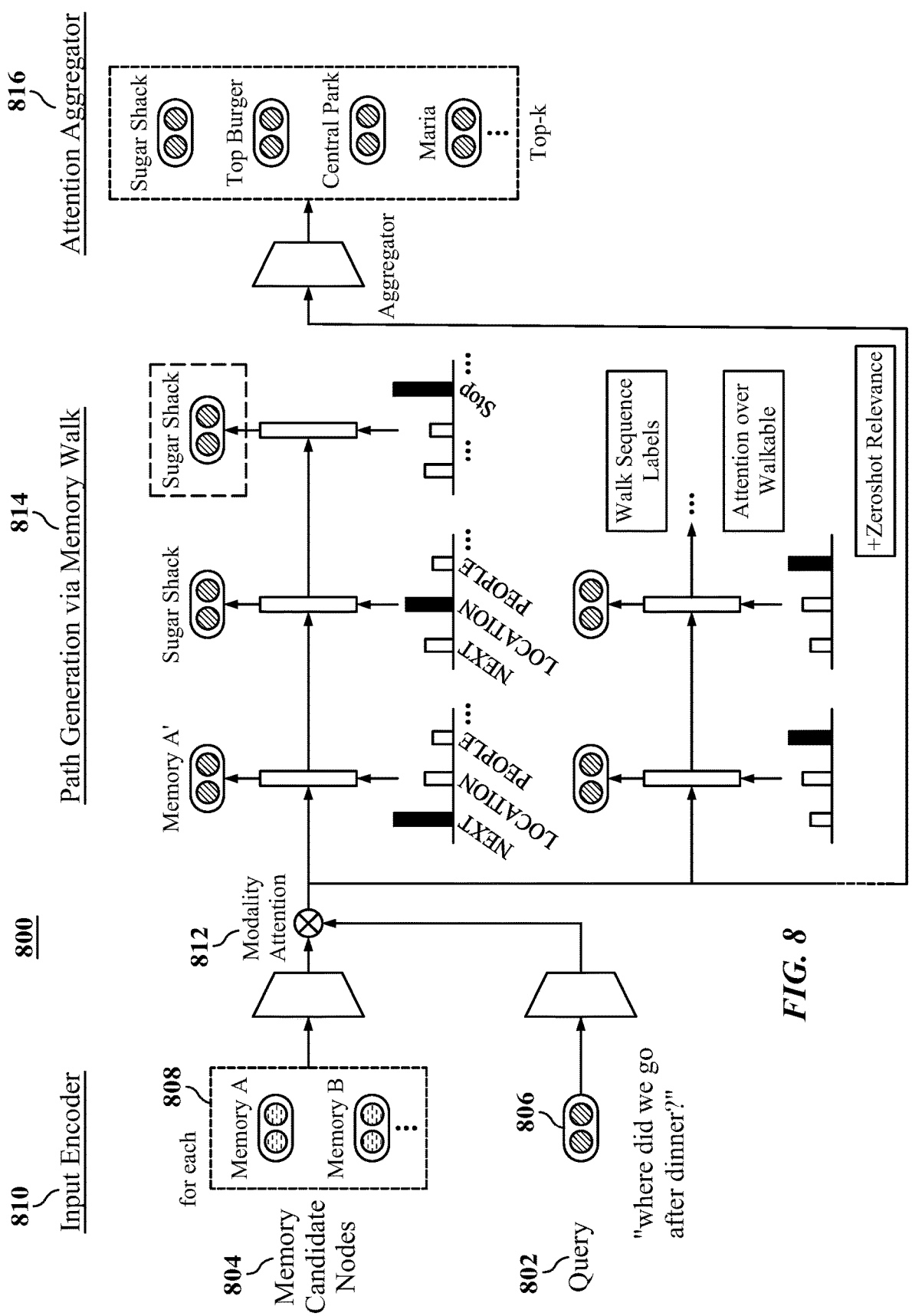
FIG. 8 illustrates an example diagram flow of processing a query based on a memory graph network.

Memory Graph Networks (MGN):

Many previous works in QA or MRC systems use memory networks to evaluate multiple answer candidates with transitive reasoning, and typically store all potentially relevant raw sentences or bag-of-symbols as memory slots. However, naive increase of memory slot size or retention-based sequential update of memory slots often increase search space for answer candidates, leading to poor precision especially for the episodic memory QA task. To overcome this issue, with MGN the embodiments disclosed herein store memory graph nodes as initial memory slots, where additional contexts and answer candidates can be succinctly expanded and reached via graph traversals. For each $(q, m^{(k)})$ pair, MGN predicts optimal memory slot expansion steps: $p^{(k)} = \{[p_{e,t}^{(k)}; p_{n,t}^{(k)}]\}_{t=1}^{T}$ for edge paths $p_e$ and corresponding node paths $p_n$. FIG. 8 illustrates an example diagram flow 800 of processing a query based on a memory graph network. FIG. 8 illustrates the memory graph network (MGN) walker. Input query q 802 and candidate memory nodes m={$m^{(k)}$} 804 are encoded with the query encoder 806 and the memory encoder 808, respectively (left), which are part of the input encoder 810. The output of the query encoder 806 and the memory encoder 808 may be processed by a modality attention module 812. The decoder (right), i.e., path generation via memory walk 814, predicts both the optimal paths and the final entities $p=[p_t]_{t=1}^{T}$ based on their zeroshot relevance scores as well as soft-attention based walk paths, which expands the initial memory slots. After that an attention aggregator 816 may aggregate the top-k entities.

QA Modules:

An estimated answer $\hat{a}=QA(m, q)$ is predicted given a query and MGN graph path output from initial memory slots. Specifically, the model outputs a module program $\{u^{(k)}\}$ for several module networks (e.g. CHOOSE, COUNT, . . . ) via module selector, each of which produces an answer vector. The aggregated result of module network outputs determines the top-k answers.

i Input Encoding

Query Encoder:

In particular embodiments, the assistant system 140 may generate a query encoding for the query based on a long-short term memory (LSTM) model. As an example and not by way of limitation, the embodiments disclosed herein represent each textual query with a state-of-the-art attention-based Bi-LSTM language model (Conneau et al., 2017) with GloVe (Pennington et al., 2014) distributed word embeddings trained on the Wikipedia and the Gigaword corpus with a total of 6B tokens.

Memory encoder: In particular embodiments, the assistant system 140 may generate a memory encoding for each node corresponding to an episodic memory in the memory graph based on one or more of a graph embeddings projection model or a LSTM model. As an example and not by way of limitation, the embodiments disclosed herein represent each memory node based on both its structural features (graph embeddings) and contextual multi-modal features from its neighboring nodes (e.g. attribute values).

The embodiments disclosed herein construct MG embeddings to encode structural contexts of each memory node $m_s$ via graph embeddings projection approaches (Bordes et al., 2013), in which semantically similar nodes are distributed closer in the embeddings space. In brief formulation, the model for obtaining embeddings from a MG (composed of subject-relation-object (s, r, o) triples) is as follows:

$$P(\mathbb{1}_r(s,o)=1|\theta) = \text{score}(e(s), e_r(r), e(o)) \quad (1)$$

where $\mathbb{1}_r$ is an indicator function of a known relation r for two entities (s,o) (1: valid relation, 0: unknown relation), e is a function that extracts embeddings for entities, $e_r$ extracts embeddings for relations, and score(•) is a deep neural network that produces a likelihood of a valid triple.

For contextual representation of memories ($m_c$), the embodiments disclosed herein compute attention-weighted sum of textual representation of neighboring nodes and attributes (connected via $r_j \in R$), using the same language model as the query encoder:

$$m_c = \Sigma \gamma_j m_{c,j}$$

$$\gamma = \sigma(W_{q\gamma} q)$$

Note that the query attention vector γ attenuates or amplifies each attribute of memory based on a query vector to better account for query-memory compatibility accordingly. The embodiments disclosed herein then concatenate the structural features with semantic contextual features to obtain the final memory representation ($m=[m_s; m_c]$).

As a result, the assistant system 140 may have a technical advantage of generating more natural and human-like responses as the response is generated based on both the user's query and relevant episodic memory of the user.

ii Memory Graph Networks

In particular embodiments, selecting the one or more candidate nodes may comprise inputting the generated query encoding and each generated memory encoding to the one or more machine-learning models. The one or more machine-learning models may then generate a sequence path of walk steps attending to the one or more candidate nodes within the memory graph. Given a set of initial memory slots (m) and a query (q), the MGN model outputs a sequence path of walk steps (p) within MG to attend to relevant nodes or expand initial memory slots (FIG. 8):

$$\{p^{(k)}\} = MGN(q, \{m^{(k)}\}) \quad (2)$$

Specifically, the embodiments disclosed herein define the attention-based graph decoder model which prunes unattended paths, which effectively reduce the search space for memory expansion. Decoding steps for MGN are formulated as follows (bias terms for gates are omitted for simplicity of notation):

$$i_t = \sigma(W_{hi} h_{t-1} + W_{ci} c_{t-1})$$

$$c_t = (1-i_t) \odot c_{t-1} + i_t \odot \tanh W_{zc} z_t + W_{hc} h_{t-1}$$

$$o_t = \sigma(W_{zo} r_t + W_{ho} h_{t-1} + W_{co} c_t)$$

$$h_t = \text{WALK}(\bar{x}, z_t) = o_t \odot \tanh(c_t) \quad (3)$$

where $z_t$ is a context vector at decoding step t, produced from the attention over walkable path which is defined as follows:

$$\bar{x} = W_{qmx}[q; m^{(k)}] \quad (4)$$

$$\alpha_t = \sigma(W_{h\alpha} h_{t-1} + W_{x\alpha} \bar{x})$$

$$z_t = h_{t-1} + \sum_{r_j \in R} \alpha_{t,j} r_j$$

where $\alpha_t \in \mathbb{R}^{[R]}$ is an attention vector over the relations space, $r_k$ is relation embeddings, and $z_t$ is a resulting node context vector after walking from its previous entity on an attended path.

The embodiments disclosed herein guide the graph decoder with the ground-truth walk paths by computing the following loss $\mathcal{L}_{walk}(m, q, p) = +\Sigma_{i,t} \mathcal{L}_e + \mathcal{L}_n$ between predicted paths and each of $\{p_e, p_n\}$, respectively ($\mathcal{L}_e$ loss for edge paths, and $\mathcal{L}_n$ for node paths):

$$\sum \max[0, \tilde{p}_e \cdot \tilde{p}_{e,t(i)} - \alpha_t r \cdot (p_{e,t}^{(i)} - \tilde{y}_e)^\top] +$$

$$\sum \max[0, \tilde{p}_n \cdot \tilde{p}_{n,t(i)} - h_{t(i)} \cdot (p_{n,t}^{(i)} - \tilde{p}_n)^\top]$$

At test time, the embodiments disclosed herein expand the memory slots by activating the nodes along the optimal paths based on the sum of their zero-shot relevance (left) and soft-attention-based output path (right) scores at each decoding step:

$$p_{n,t}^{(k)} = \operatorname{argmax} h_t \cdot p_n^{(i)T} + \Sigma \alpha_{t,j} r_j \cdot p_e^{(k)T}$$

$$P_n^{(k)} \in V_{R,1}(p_{n,t1}^{(k)}) \tag{5}$$

As a result, the assistant system 140 may have a technical advantage of providing a natural way to explain how and why a response is generated because the walk paths on the memory graph are easy to interpret.

iii Module Networks

The embodiments disclosed herein extend the previous work in module networks (Kottur et al., 2018), often used in VQA tasks, to accommodate for graph nodes output via MGN. The embodiments disclosed herein formulate the module selector which outputs the module label probability $\{u^{(k)}\}$ for each memory node, trained with cross-entropy loss $\mathcal{L}_{module}$:

$$\{u^{(k)}\} = \operatorname{Softmax}(MLP(q, \{m^{(k)}\})) \tag{6}$$

The embodiments disclosed herein then define the memory attention to attenuate or amplify all activated memory nodes based on their compatibility with query, formulated as follows:

$$\beta = MLP(q, \{m^{(k)}\}, \{p^{(k)}\}) \tag{7}$$

$$\alpha = \operatorname{Softmax}(W_\beta^T \beta) \in \mathbb{R}^K \tag{8}$$

Photo Recommender:

In particular embodiments, the memory and the path attention embeddings outputs may be then used to recommend photos associated with each activated memory node $m^{(k)}$:

$$\{i^{(k)}\} = \operatorname{Softmax}(MLP(a^{(k)}, \{m^{(k)}\})) \forall k, \tag{9}$$

where the output score is used to rank the candidate photos. Photos with the top score (above threshold) are then finally surfaced.

In particular embodiments, the following four modules, i.e., CHOOSE, COUNT, CONFIRM, SET OR, and SET_AND may be further used for generating a response. As a result, $u^{(k)} \in \mathbb{R}^5$. Note that the formulation can be extended to the auto-regressive decoder in case sequential execution of modules is required.

In particular embodiments, the assistant system 140 may input the generated query encoding, each generated memory encoding, and the sequence path of walk steps to the one or more machine-learning models. The one or more machine-learning models may generate one or more answer candidates. In particular embodiments, the answer candidates may be ranked in an order based a compatibility between the query and the respective answer candidate. The compatibility may be determined by the one or more machine-learning models. As an example and not by way of limitation, the compatibility may be determined based on Eq. (7) and Eq. (8). In particular embodiments, the assistant system 140 may further aggregate, by the one or more machine-learning models, the one or more answer candidates. Each answer candidate may be associated with a weight and the weight may be determined based on the rank associated with the respective answer candidate.

CHOOSE module outputs answer space vector by assigning weighted sum scores to nodes along the MGN soft-attention walk paths. End nodes with the most probable walk paths thus get the highest scores, and their node attribute values are considered as answer candidates. COUNT module counts the query-compatible among the activated nodes, $a = W_K^T[\alpha; \max\{\alpha\}; \min\{\alpha\}])$. CONFIRM uses a similar approach to COUNT, except it outputs a binary label indicating whether the memory nodes match the query condition: $a = W_b^T([\alpha; \max\{\alpha\}; \min\{\alpha\}])$. SET modules either combine or find intersection among answer candidates by updating the answer vectors with $a = \max\{W_K^T\{a^{(k)}\}\}$ ([$\alpha; \max\{\alpha\}; \min\{\alpha\}$]).

iv Answer Decoding

Answers from each module network are then aggregated as weighted sum of answer vectors with module probability (Eq.6), guided by memory attention (Eq.7). Predicted answers are evaluated with cross-entropy loss $\mathcal{L}_{ans}$.

It is observed that the model performs better when the MGN component of the model is pre-trained with ground-truth paths. The embodiments disclosed herein thus first train the MGN network with the same training split (without answer labels), and then train the entire model with module networks, fully end-to-end supervised with $\mathcal{L} = \mathcal{L}_{walk} + \mathcal{L}_{module} + \mathcal{L}_{ans}$.

Data

To train and evaluate the proposed approach for the Episodic Memory QA task, the embodiments disclosed herein create a new dataset, MemQA, of 100K question and answer pairs composed based on synthetic memory graphs that are artificially generated. The embodiments disclosed herein specifically use the synthetically generated MG to avoid the need for inferring memory graphs from other structured data (such as publicly available photo albums) which are often limited in size and domains. In particular embodiments, the assistant system 140 may build a synthetic memory graph generator. The assistant system 140 may then generate, by the synthetic memory graph generator, one or more nodes in the memory graph. Each of the one or more nodes may be connected to one or more entities associated with the knowledge graph. To be more specific, the embodiments disclosed herein bootstrap our large-scale realistic memory graph dataset with the following procedures: first, the embodiments disclosed herein construct a synthetic social graph with a set number of artificial users, each with randomly generated interest embeddings. The embodiments disclosed herein then create a realistic memory graph by randomly choosing participants within the synthetic social graph as well as activities and associated entities from the curated list (of locations, events, public entities, etc.), which is a subset of common-fact Freebase knowledge base ((Bast et al., 2014)). Each generated memory node thus has connections to entities appearing in KGs, comprising the memory graph together. Finally, given a set of reference memory nodes and neighboring attributes, the embodiments disclosed herein pragmatically generate target ground-truth answer samples (e.g. single-hop/multi-hop node value, count, set comparison, yes/no, etc.) Note also that by representing the memory database in a graph format, it allows for flexible operations required for complex QA and conversational reasoning. In alternative embodiments, the episodic memories of the user may be extracted from one or more of a plurality of content objects associated with the user, social-networking information associated with the user, contact information associated with the user, calendar information associated with the user, or interactions with one or more other users in an online social network. The embodiments disclosed herein then collect QA pairs for each sample with templates composed with human annotators, which are combined with 1K manual paraphrasing steps for added variety and confirmation. The embodiments disclosed herein randomly split the QA corpus into train (70%), validation (15%), and test sets (15%).

TABLE 1

Types of Answers in MemQA

| Answer Type | % | Examples |
| --- | --- | --- |
| Location | 18 | Mt. Rainier AMC Theater |
| KG entities & events | 17 | Iron Man, Coachella |
| Common nouns, etc. | 16 | skiing, movie |
| Person/Group | 16 | Mark, Jon |
| Count | 15 | zero, three |
| Date/Time | 10 | Jan. 2, 2018, 7 PM |
| Yes/No | 6 | — |
| Miscellaneous | 2 | — |

Evaluation

Task: Given a query and a set of initial memory graph nodes via graph search, the embodiments disclosed herein evaluate the model on the open-ended question answering prediction task.

i Baselines

The embodiments disclosed herein choose as baselines the following state-of-the-art QA systems, and modify accordingly to make fair comparisons with our task:

MemN2N (Sukhbaatar et al., 2016): uses the end-to-end memory networks with the static set of initial memory slots. Each memory slot is represented with a bag-of-symbols for surrounding attributes and nodes. The embodiments disclosed herein use a single Softmax layer for answer classification. Memory slot size is tuned as a hyper-parameter.

BiDAF (Seo et al., 2017)+Graph Attention: extends the MemN2N with bidirectional attention flow for better memory-query compatibility modeling. To make this baseline stronger and fit for the task, the embodiments disclosed herein augment the output LSTM layer with graph attention, effectively pruning the answer space.

MemexNet (Jiang et al., 2018): uses the textual representation for all multi-modal attributes and uses text kernel match approaches to predict answers.

The embodiments disclosed herein also consider several configurations of our proposed approach to examine contributions of each component (model components (G): Memory Graph Network, (N): Module Networks, (E): structural graph embeddings).

(Proposed; G+N+E): is the proposed approach as described in FIG. 8.

(G+N): does not structural graph embeddings for MGN and relies on semantic representation of surrounding nodes.

(G): does not use any of the module networks (e.g. COUNT, . . . ) and predicts MGN graph output as answers instead.

i Results

Parameters:

The embodiments disclosed herein tune the parameters of each model with the following search space (bold indicate the choice for our final model): graph embeddings size: {64, 128, 256, 512}, Bi-LSTM hidden states for the language model: {64, 128, 256, 512}, MGN hidden states: {64, 128, 256, 512}, word embeddings size: {100, 200, 300}, and max memory slots: {1, 5, 10, 20, 40, 80}. The embodiments disclosed herein optimize the parameters with Adagrad (Duchi et al., 2011) with batch size 10, learning rate 0.01, epsilon $10^{-8}$, and decay 0.1.

Main Results:

Table 2 shows the results of the top-k predictions of the proposed model and the baselines. It can be seen that the proposed Memory QA model outperforms other state-of-the-art baselines for precision at all ks.

TABLE 2

QA performance on the MemQA dataset (metric: precision@k). Our proposed model is compared against state-of-the-art models as well as several ablation variations of the proposed model (model components (G): Memory Graph Network, (N): Module Networks, (E): graph embeddings).

| Components | Model | Precision@k | | | |
| --- | --- | --- | --- | --- | --- |
| | | k = 1 | 3 | 5 | 10 |
| A | MemN2N (Sukhbaatar et al., 2016) | 29.7 | 43.8 | 51.0 | 50.5 |
| A | BiDAF (Seo et al., 2017) | 31.6 | 46.5 | 56.9 | 58.5 |
| A | Memex (Jiang et al., 2018) | 32.6 | 50.3 | 58.2 | 59.1 |
| G | MemQANet (ablation) | 36.7 | 56.8 | 63.5 | 67.9 |
| G + N | MemQANet (ablation) | 41.1 | 65.8 | 75.5 | 80.0 |
| G + N + E | MemQANet (proposed) | 45.8 | 68.1 | 75.7 | 80.9 |

Specifically, with the MGN walker model, the MemQA model learns to condition its walk path on query contexts and attend and expand memory nodes, thus outperforming the baseline models that simply rely on their initial memory slots, typically large in size to maintain reasonable recall. The node expansion via MGN allows the model to keep the initial memory slots small (10) and expand only when necessary, thus improving the precision performance. Note that memory slot sizes for baselines are tuned for their performance on the validation set.

In addition, it can be seen that the neural module components (G+N and G+N+E) greatly outperform the ablation model (G) and the baselines by aggregating answers with the modules specifically designed for various types of questions. These neural modules allow the model to answer questions that are typically hard to answer (e.g. count, set comparison, etc.) by explicitly reducing the answer space accordingly.

Note also that the graph embeddings (G+N+E) improve the performance over the ablation model that does not use structural contexts (G+N), indicating that the model learns to better leverage knowledge graph contexts to answer questions.

TABLE 3

Error Analysis: Model predictions of walk paths (with expanded memory nodes noted with ') and attended nodes are partially shown for each question and ground-truth answer pair. The full reference memory graphs are not shown here due to space constraints. Initial memory slot size = 10.

| | Model Prediction | | | |
|---|---|---|---|---|
| Question and Answer | Walk Path | Attended Nodes | Neural Module | Top-k Answers |
| Q: Where did Jon and I go after we watched Avengers? // A: Symphony Hall | $m_1 \rightarrow$ (NEXT_ID) $\rightarrow$ $m'_1 \rightarrow$ (LOCATION) | $m_1, m'_1, \ldots$ | CHOOSE | Symphony Hall, AMC Theatre, ... |
| Q: Who did I go skiing with last year? A: {Emma, Jacob} | $m_1 \rightarrow$ (PARTICIPANT) $m_1 \rightarrow$ (PARTICIPANT) | $m_1$. TAGS, $m_3$. TAGS | SET_OR | {Emma, Jacob}, {Emma, Noah}, ... |
| Q: How many sci-fi movies have I watched last year? // A: Two | $m_1 \rightarrow$ (ENTITY) $\rightarrow$ $e'_1 \rightarrow$ (GENRE) $\rightarrow$ $e'_1$ | $m_1$. TAGS, $a'_1$, $a'_2, a'_3 \ldots$ | COUNT | Three, Two, Four, ... |

Error Analysis:

Table 3 shows some of the example output from the proposed model, given the input question and memory graph nodes. It can be seen that the model is able to predict answers by combining answer contexts from multiple components (walk path, node attention, neural modules, etc.) In general, the MGN walker successfully explores the respective single-hop or multi-hop relations within the memory graph, while keeping the initial memory slots small enough. The activated nodes via graph traversals are then used as input for each neural module, the aggregated results of which are the final top-k answer predictions. There are some cases where the final answer prediction is incorrect, whereas its walk path is correctly predicted. This is due to inaccurate prediction of memory attention vector given a query and initial memory slots, which requires comprehensive understanding of surrounding knowledge nodes in the context of the query.

Related Work

End-to-End Dialog Systems:

There have been a number of works on end-to-end dialog systems, often focused on task or goal-oriented dialog systems such as conversational recommendations (Salem et al., 2014; Bordes et al., 2017; Sun and Zhang, 2018; Dalton, 2018), information querying (Williams et al., 2017; de Vries et al., 2018; Reddy et al., 2018), etc. Many of the public datasets are collected via bootstrapped simulations (Bordes et al., 2017), Wizard-of-Oz setup (Zhang et al., 2018; Wei et al., 2018), or online corpus (Li et al., 2016). The embodiments disclosed herein propose a unique setup for dialog systems called memory-grounded conversations, where the focus is on grounding human conversations with past user memories for both the goal-oriented task (memory recall QA) and the more open-ended dialogs (proactive memory reference). The embodiments disclosed herein follow the approaches taken from other previous work that bootstrap the dialog dataset collection process through simulations (via memory graph generator).

Memory Networks:

Weston et al. (2014); Sukhbaatar et al. (2016) propose Memory Net-works with explicit memory slots to contain auxiliary multi-input, now widely used in many QA and MRC tasks for its transitive reasoning capability. Traditional limitations may be that memory slots for storing answer candidates are fixed in size, and naively increasing the slot size typically decreases the precision. Several works extend this line of re-search, for example by allowing for dynamic update of memory slots given streams of input (Ku-mar et al., 2016; Tran et al., 2016), reinforcement learning based retention control (Jung et al., 2018), etc. By allowing for storing graph nodes as memory slots and for slot expansion via graph traversals, the memory graph networks (MGN) disclosed herein may effectively bypass the issues.

Structured QA Systems:

These systems often answer questions based on large-scale common fact knowledge graphs (Bordes et al., 2015; Xu et al., 2016; Yin et al., 2016; Dubey et al., 2018), typically via an entity linking system and a QA model for predicting graph operations through template matching approaches, etc. The embodiments disclosed herein are inspired by this line of work, and the embodiments disclosed herein utilize the proposed module networks and the MGN walker model to address unique challenges to Episodic Memory QA.

Machine Reading Comprehension (MRC) Systems:

These systems aim at predicting answers given evidence documents, typically in length of a few paragraphs (Seo et al., 2017; Rajpurkar et al., 2016, 2018). Several recent works address multi-hop reasoning within multiple documents (Yang et al., 2018; Welbl et al., 2018; Bauer et al., 2018; Clark et al., 2018) or conversational settings (Choi et al., 2018; Reddy et al., 2018), which require often complex reasoning tools. Unlike in MRC systems that typically rely on language understanding, the embodiments disclosed herein may effectively utilize structural properties of memory graph to traverse and highlight specific attributes or nodes that are required to answer questions.

Visual QA Systems:

These systems aim to answer questions based on contexts from images (Antol et al., 2015; Wang et al., 2018; Wu et al., 2018). Recently, neural modules (Kottur et al., 2018) are proposed to address specific challenges to VQA such as visual co-reference resolutions, etc. The embodiments disclosed herein extend the idea of neural modules for Episodic Memory QA by implementing modules that can take graph paths as input for answer decoding. Jiang et al. (2018) proposes visual memex QA which tackles similar problem domains given a dataset collected around photo albums. Instead of relying on meta information and multi-modal content of a photo album, the embodiments disclosed herein explicitly utilize semantic and structural contexts from memory and knowledge graphs. Another recent line of work for VQA includes graph based visual learning (Hudson and Manning, 2019), which aims to represent each image with a sub-graph of visual contexts. While graph-based VQA operates on a graph constructed from a single scene, Episodic Memory QA operates on a large-scale memory graph with knowledge nodes. The embodiments disclosed herein therefore propose memory graph networks to handle ambiguous candidate nodes, a main contribution of the embodiments disclosed herein.

Conclusions

The embodiments disclosed herein introduce episodic memory QA, the task of answering personal user questions grounded on memory graph (MG), and a new benchmark dataset called MemQA. The MemQA dataset is generated with synthetic memory graphs with simulated attributes and accompanied with 100K QA pairs composed via bootstrapped scripts and manual annotations. Several novel model components are proposed for unique challenges for MemQA: 1) memory graph networks (MGN) extend the conventional memory networks by enabling dynamic expansion of memory slots through graph traversals, which also naturally allows for explainable predictions. 2) Several neural module networks are proposed for the proposed task, each of which takes queries and memory graphs as input to infer answers. 3) The main episodic memory QA net aggregates answer prediction from each neural module to generate final answer candidates. The empirical results demonstrate the efficacy of the proposed model in MemQA reasoning.

Figure 9:
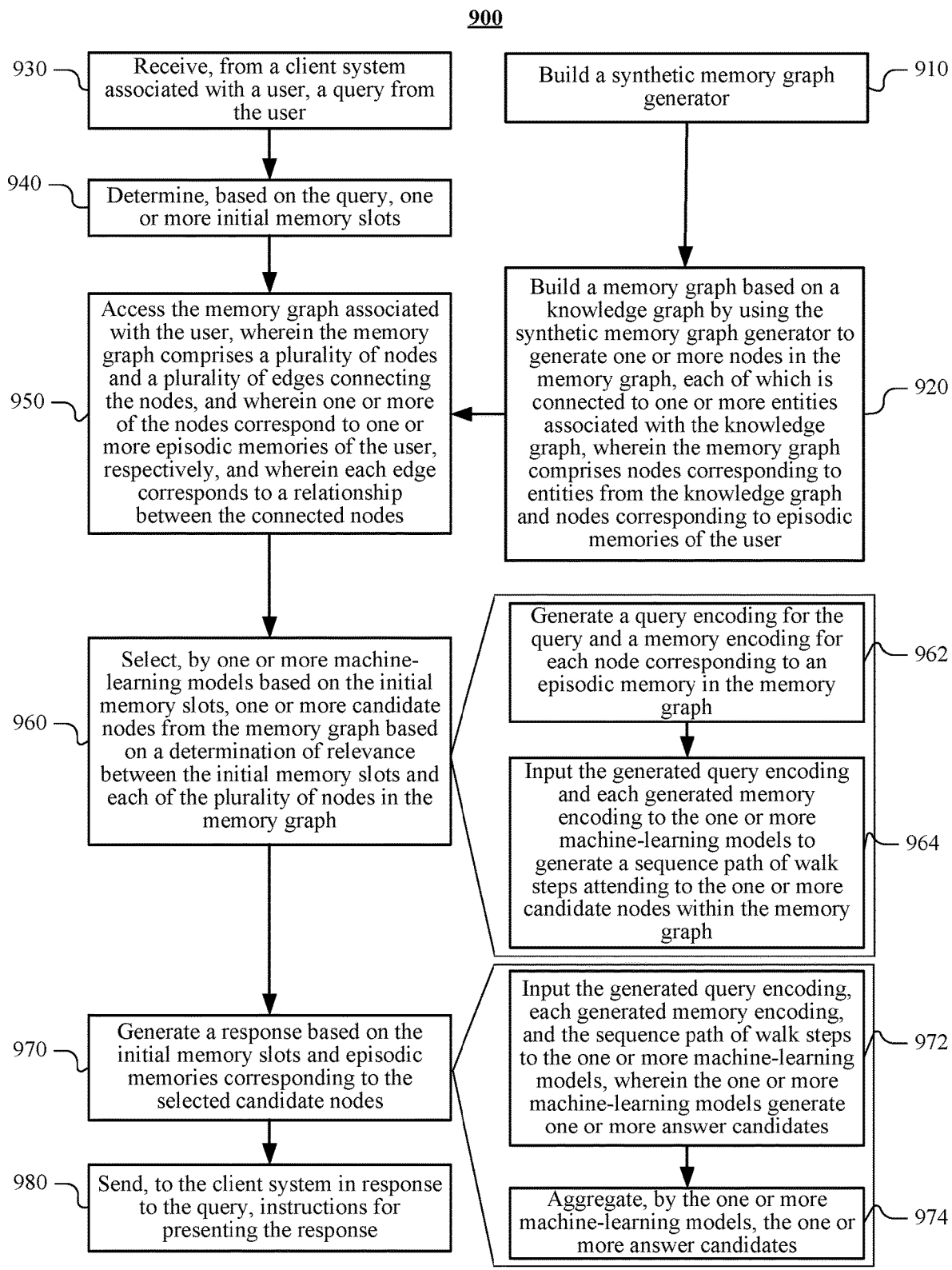
FIG. 9 illustrates an example method for memory grounded conversational reasoning.

FIG. 9 illustrates an example method 900 for conversational reasoning based on a knowledge graph. The method may begin at step 910, where the assistant system 140 may build a synthetic memory graph generator. At step 920, the assistant system 140 may build a memory graph based on a knowledge graph by using the synthetic memory graph generator to generate one or more nodes in the memory graph, each of which is connected to one or more entities associated with the knowledge graph, wherein the memory graph comprises nodes corresponding to entities from the knowledge graph and nodes corresponding to episodic memories of the user. receive, from a client system 130 associated with a user, a query from the user. At step 930, the assistant system 140 may receive, from a client system 130 associated with a user, a query from the user. At step 940, the assistant system 140 may determine, based on the query, one or more initial memory slots. At step 950, the assistant system 140 may access the memory graph associated with the user, which is built based on steps 910 and 920. The memory graph may comprise a plurality of nodes and a plurality of edges connecting the nodes, and wherein one or more of the nodes correspond to one or more episodic memories of the user, respectively, and wherein each edge corresponds to a relationship between the connected nodes. At step 960, the assistant system 140 may select, by one or more machine-learning models based on the initial memory slots, one or more candidate nodes from the memory graph based on a determination of relevance between the initial memory slots and each of the plurality of nodes in the memory graph. Step 960 may comprise the following sub-steps: At sub-step 962, the assistant system 140 may generate a query encoding for the query and a memory encoding for each node corresponding to an episodic memory in the memory graph. At sub-step 964, the assistant system 140 may input the generated query encoding and each generated memory encoding to the one or more machine-learning models to generate a sequence path of walk steps attending to the one or more candidate nodes within the memory graph. At step 970, the assistant system 140 may generate a response based on the initial memory slots and episodic memories corresponding to the selected candidate nodes. Step 970 may comprise the following sub-steps: At sub-step 972, the assistant system 140 may input the generated query encoding, each generated memory encoding, and the sequence path of walk steps to the one or more machine-learning models, wherein the one or more machine-learning models generate one or more answer candidates. At sub-step 974, the assistant system 140 may aggregate, by the one or more machine-learning models, the one or more answer candidates. At step 980, the assistant system 140 may send, to the client system 130 in response to the query, instructions for presenting the response. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for conversational reasoning based on a knowledge graph including the particular steps of the method of FIG. 9, this disclosure contemplates any suitable method for conversational reasoning based on a knowledge graph including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

References

The following list of references correspond to the citations above:

Stanislaw Antol, Aishwarya Agrawal, Jiasen Lu, Margaret Mitchell, Dhruv Batra, C. Lawrence Zitnick, and Devi Parikh. 2015. VQA: Visual Question Answering. In ICCV.

Hannah Bast, Florian Baurle, Bjorn Buchhold, and Elmar Haussmann. 2014. Easy access to the freebase dataset. In WWW.

Lisa Bauer, Yicheng Wang, and Mohit Bansal. 2018. Commonsense for generative multi-hop question answering tasks. EMNLP Antoine Bordes, Nicolas Usunier, Sumit Chopra, and Jason Weston. 2015. Large-scale simple question answering with memory network. arxiv.

Antoine Bordes, Nicolas Usunier, Alberto Garcia-Duran, Jason Weston, and Oksana Yakhnenko. 2013. Translating embeddings for modeling multi-relational data. In NIPS.

Eunsol Choi, He He, Mohit Iyyer, Mark Yatskar, Wentau Yih, Yejin Choi, Percy Liang, and Luke Zettlemoyer. 2018. Quac: Question answering in context. EMNLP.

Peter Clark, Isaac Cowhey, Oren Etzioni, Tushar Khot, Ashish Sabharwal, *Carissa* Schoenick, and Oyvind Tafjord. 2018. Think you have solved question answering? try arc, the ai2 reasoning challenge. arXiv:1803.05457.

Alexis Conneau, Douwe Kiela, Holger Schwenk, Loic Barrault, and Antoine Bordes. 2017. Supervised learning of universal sentence representations from natural language inference data. In EMNLP.

Mohnish Dubey, Debayan Banerjee, Debanjan Chaudhuri, and Jens Lehmann. 2018. Earl: Joint entity and relation linking for question answering over knowledge graphs. ESWC.

John Duchi, Elad Hazan, and Yoram Singer. 2011. Adaptive subgradient methods for online learning and stochastic optimization. JMLR.

Drew A Hudson and Christopher D Manning. 2019. Gqa: A new dataset for real-world visual reasoning and compositional question answering. CVPR.

Lu Jiang, Junwei Liang, Liangliang Cao, Yannis Kalantidis, Sachin Farfade, and Alexander Hauptmann. 2018. Memexqa: Visual memex question answering. NIPS.

Hyunwoo Jung, Moonsu Han, Minki Kang, and Sungju Hwang. 2018. Learning what to remember: Long-term episodic memory networks for learning from streaming data. arXiv preprint arXiv: 1812.04227.

Satwik Kottur, Jose M F Moura, Devi Parikh, Dhruv Batra, and Marcus Rohrbach. 2018. Visual coreference resolution in visual dialog using neural module networks. In ECCV.

Ankit Kumar, Ozan Irsoy, Peter Ondruska, Mohit Iyyer, James Bradbury, Ishaan Gulrajani, Victor Zhong, Romain Paulus, and Richard Socher. 2016. Ask me anything: Dynamic memory networks for natural language processing. In ICML.

Jeffrey Pennington, Richard Socher, and Christopher D. Manning. 2014. Glove: Global vectors for word representation. In EMNLP.

Pranav Rajpurkar, Robin Jia, and Percy Liang. 2018. Know what you don't know: Unanswerable questions for squad. ACL.

Pranav Rajpurkar, Jian Zhang, Konstantin Lopyrev, and Percy Liang. 2016. Squad: 100,000+ questions for machine comprehension of text. arXiv:1606.05250.

Siva Reddy, Danqi Chen, and Christopher D Manning. 2018. Coqa: A conversational question answering challenge. arXiv preprint arXiv:1808.07042.

Minjoon Seo, Aniruddha Kembhavi, Ali Farhadi, and Hannaneh Hajishirzi. 2017. Bidirectional attention flow for machine comprehension. ICLR.

Sainbayar Sukhbaatar, Arthur Szlam, Jason Weston, and Rob Fergus. 2016. End-to-end memory networks. NIPS.

Ke Tran, Arianna Bisazza, and Christof Monz. 2016. Recurrent memory networks for language modeling. NAACL.

Peng Wang, Qi Wu, Chunhua Shen, Anthony Dick, and Anton van den Hengel. 2018. Fvqa: Fact-based visual question answering. PAMI.

Johannes Welbl, Pontus Stenetorp, and Sebastian Riedel. 2018. Constructing datasets for multi-hop reading comprehension across documents. TACL.

Yasser Salem, Jun Hong, and Weiru Liu. 2014. History-guided conversational recommendation. In WWW.

Antoine Bordes, Y-Lan Boureau, and Jason Weston. 2017. Learning end-to-end goal-oriented dialog. ICLR.

Yueming Sun and Yi Zhang. 2018. Conversational recommender system. SIGIR.

Jeff Dalton. 2018. Vote goat: Conversational movie recommendation. SIGIR.

Jason D Williams, Kavosh Asadi, and Geoffrey Zweig. 2017. Hybrid code networks: practical and efficient end-to-end dialog control with supervised and reinforcement learning. ACL.

Harm de Vries, Kurt Shuster, Dhruv Batra, Devi Parikh, Jason Weston, and Douwe Kiela. 2018. Talk the walk: Navigating new york city through grounded dialogue. ECCV.

Saizheng Zhang, Emily Dinan, Jack Urbanek, Arthur Szlam, Douwe Kiela, and Jason Weston. 2018. Personalizing dialogue agents: I have a dog, do you have pets too? ACL.

Wei Wei, Quoc Le, Andrew Dai, and Jia Li. 2018. Airdialogue: An environment for goal-oriented dialogue research. In EMNLP.

Jiwei Li, Michel Galley, Chris Brockett, Georgios P Spithourakis, Jianfeng Gao, and Bill Dolan. 2016. A persona-based neural conversation model. ACL.

Jason Weston, Sumit Chopra, and Antoine Bordes. 2014. Memory networks. arXiv preprint arXiv:1410.3916.

Qi Wu, Chunhua Shen, Peng Wang, Anthony Dick, and Anton van den Hengel. 2018. Image captioning and visual question answering based on attributes and external knowledge. PAMI.

Kun Xu, Siva Reddy, Yansong Feng, Songfang Huang, and Dongyan Zhao. 2016. Question answering on freebase via relation extraction and textual evidence. ACL.

Zhilin Yang, Peng Qi, Saizheng Zhang, Yoshua Bengio, William W Cohen, Ruslan Salakhutdinov, and Christopher D Manning. 2018. Hotpotqa: A dataset for diverse, explainable multi-hop question answering. EMNLP.

Wenpeng Yin, Mo Yu, Bing Xiang, Bowen Zhou, and Hinrich Schutze. 2016. Simple question answering by attentive convolutional neural network. COLING.

Social Graphs

Figure 10:
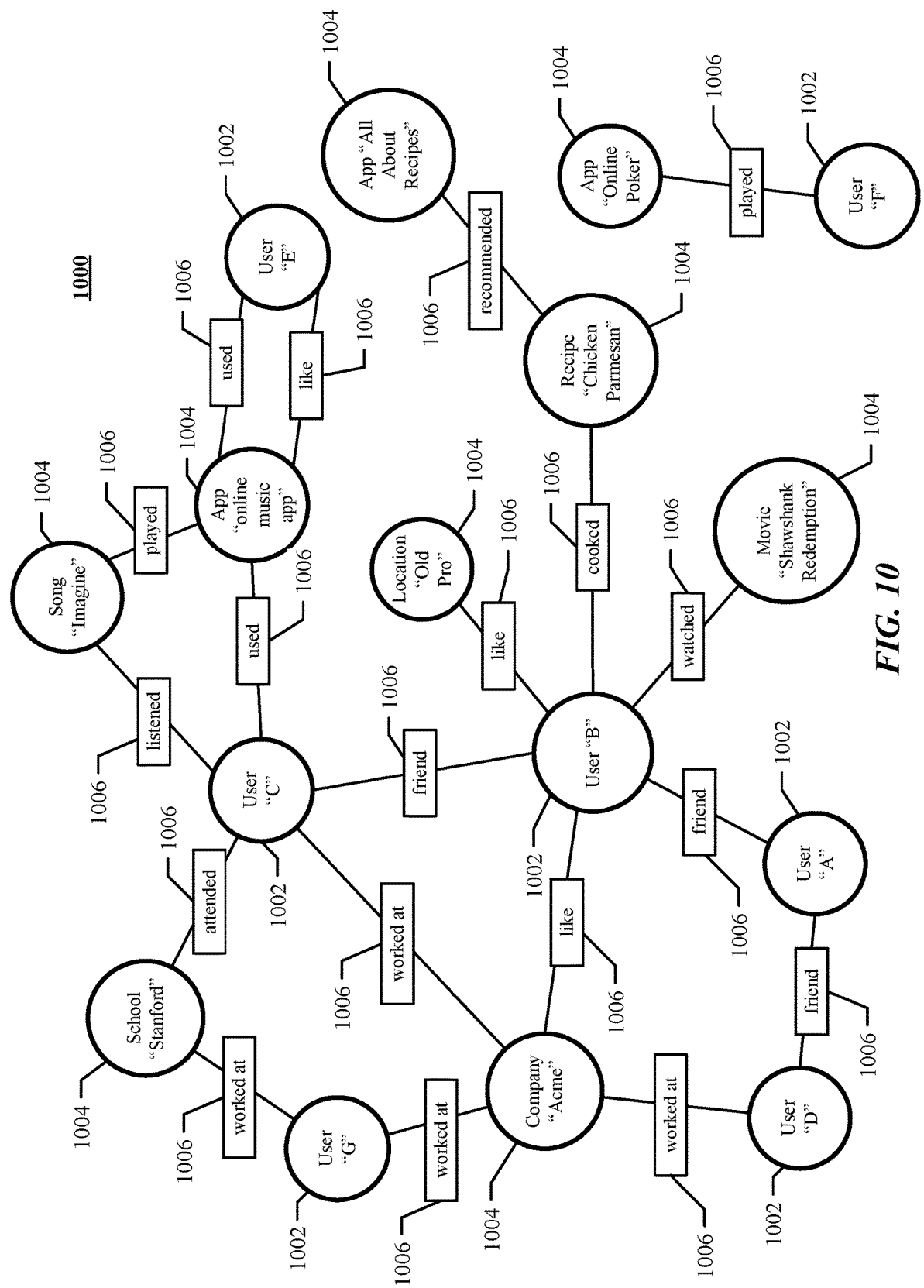
FIG. 10 illustrates an example social graph.

FIG. 10 illustrates an example social graph 1000. In particular embodiments, the social-networking system 160 may store one or more social graphs 1000 in one or more data stores. In particular embodiments, the social graph 1000 may include multiple nodes—which may include multiple user nodes 1002 or multiple concept nodes 1004—and multiple edges 1006 connecting the nodes. Each node may be associated with a unique entity (i.e., user or concept), each of which may have a unique identifier (ID), such as a unique number or username. The example social graph 1000 illustrated in FIG. 10 is shown, for didactic purposes, in a two-dimensional visual map representation. In particular embodiments, a social-networking system 160, a client system 130, an assistant system 140, or a third-party system 170 may access the social graph 1000 and related social-graph information for suitable applications. The nodes and edges of the social graph 1000 may be stored as data objects, for example, in a data store (such as a social-graph database). Such a data store may include one or more searchable or queryable indexes of nodes or edges of the social graph 1000.

In particular embodiments, a user node 1002 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with the social-networking system 160. In particular embodiments, a user node 1002 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more web interfaces.

In particular embodiments, a concept node 1004 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more web interfaces.

In particular embodiments, a node in the social graph 1000 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1004. Profile interfaces may be viewable by all or a selected subset of other users. As an example and not by way of limitation, a user node 1002 may have a corresponding user-profile interface in which the corresponding user may add content, make declarations, or otherwise express himself or herself. As another example and not by way of limitation, a concept node 1004 may have a corresponding concept-profile interface in which one or more users may add content, make declarations, or express themselves, particularly in relation to the concept corresponding to concept node 1004.

In particular embodiments, a concept node 1004 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1002 corresponding to the user and a concept node 1004 corresponding to the third-party web interface or resource and store edge 1006 in one or more data stores.

In particular embodiments, a pair of nodes in the social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1006 connecting the first user's user node 1002 to the second user's user node 1002 in the social graph 1000 and store edge 1006 as social-graph information in one or more of data stores 164. In the example of FIG. 10, the social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile interface corresponding to a concept node 1004 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, the social-networking system 160 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (the third-party online music application) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "online music application").

In particular embodiments, the social-networking system 160 may create an edge 1006 between a user node 1002 and a concept node 1004 in the social graph 1000. As an example and not by way of limitation, a user viewing a concept-profile interface (such as, for example, by using a web browser or a special-purpose application hosted by the user's client system 130) may indicate that he or she likes the concept represented by the concept node 1004 by clicking or selecting a "Like" icon, which may cause the user's client system 130 to send to the social-networking system 160 a message indicating the user's liking of the concept associated with the concept-profile interface. In response to the message, the social-networking system 160 may create an edge 1006 between user node 1002 associated with the user and concept node 1004, as illustrated by "like" edge 1006 between the user and concept node 1004. In particular embodiments, the social-networking system 160 may store an edge 1006 in one or more data stores. In particular embodiments, an edge 1006 may be automatically formed by the social-networking system 160 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Vector Spaces and Embeddings

Figure 11:
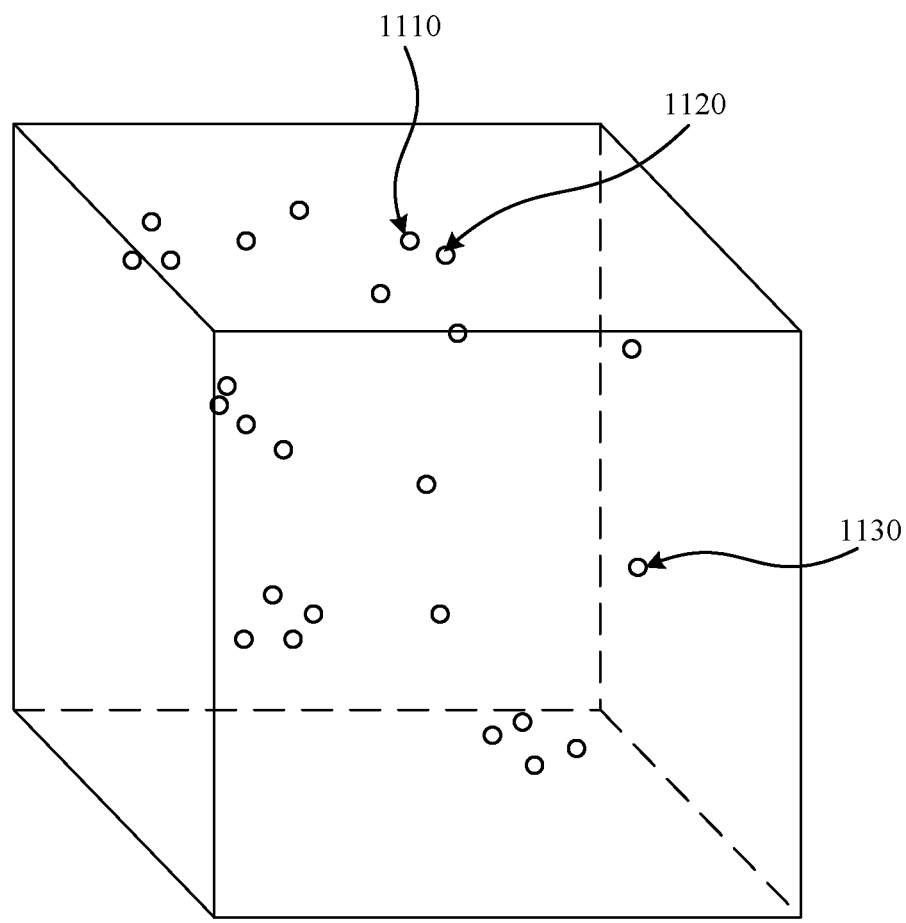
FIG. 11 illustrates an example view of an embedding space.

FIG. 11 illustrates an example view of a vector space 1100. In particular embodiments, an object or an n-gram may be represented in a d-dimensional vector space, where d denotes any suitable number of dimensions. Although the vector space 1100 is illustrated as a three-dimensional space, this is for illustrative purposes only, as the vector space 1100 may be of any suitable dimension. In particular embodiments, an n-gram may be represented in the vector space 1100 as a vector referred to as a term embedding. Each vector may comprise coordinates corresponding to a particular point in the vector space 1100 (i.e., the terminal point of the vector). As an example and not by way of limitation, vectors 1110, 1120, and 1130 may be represented as points in the vector space 1100, as illustrated in FIG. 11. An n-gram may be mapped to a respective vector representation. As an example and not by way of limitation, n-grams $t_1$ and $t_2$ may be mapped to vectors $\vec{v_1}$ and $\vec{v_2}$ in the vector space 1100, respectively, by applying a function $\vec{\pi}$ defined by a dictionary, such that $\vec{v_1} = \vec{\pi}(t_1)$ and $\vec{v_2} = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 1100. In particular embodiments, an n-gram may be mapped to a vector representation in the vector space 1100 by using a machine leaning model (e.g., a neural network). The machine learning model may have been trained using a sequence of training data (e.g., a corpus of objects each comprising n-grams).

In particular embodiments, an object may be represented in the vector space 1100 as a vector referred to as a feature vector or an object embedding. As an example and not by way of limitation, objects $e_1$ and $e_2$ may be mapped to vectors $\vec{v_1}$ and $\vec{v_2}$ in the vector space 1100, respectively, by applying a function $\vec{\pi}$, such that $\vec{v_1} = \vec{\pi}(e_1)$ and $\vec{v_2} = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function i may map the object to a vector using a transformed reduced set of features (e.g., feature selection). In particular embodiments, a function i may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1100. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1} \cdot \vec{v_2}}{\|\vec{v_1}\| \|\vec{v_2}\|}.$$

As another example and not by way of limitation, a similarity metric of $\vec{v_1}$ and $\vec{v_2}$ may be a Euclidean distance $\|\vec{v_1} - \vec{v_2}\|$. A similarity metric of two vectors may represent how similar the two objects or n-grams corresponding to the two vectors, respectively, are to one another, as measured by the distance between the two vectors in the vector space 1100. As an example and not by way of limitation, vector 1110 and vector 1120 may correspond to objects that are more similar to one another than the objects corresponding to vector 1110 and vector 1130, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 12:
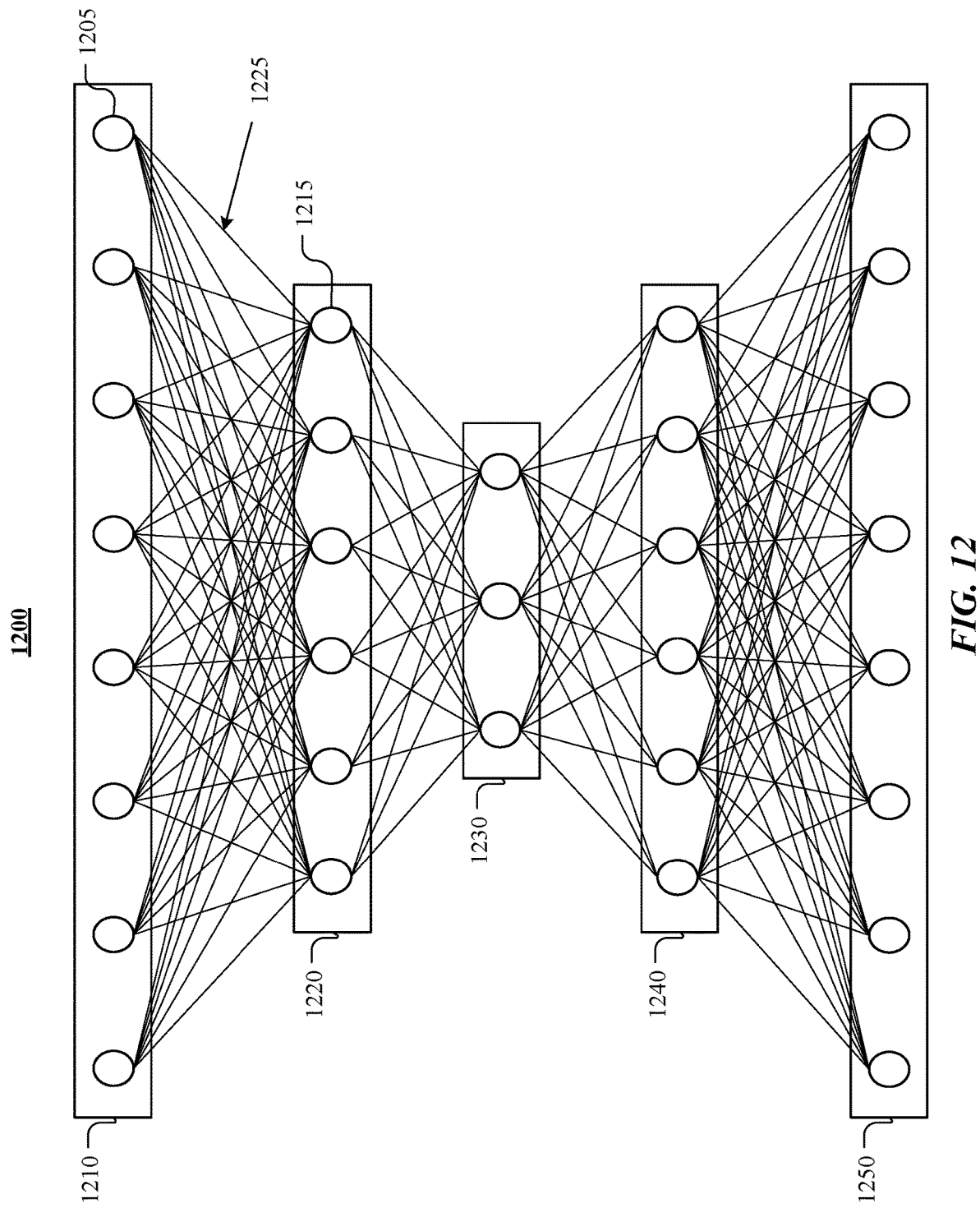
FIG. 12 illustrates an example artificial neural network.

FIG. 12 illustrates an example artificial neural network ("ANN") 1200. In particular embodiments, an ANN may refer to a computational model comprising one or more nodes. Example ANN 1200 may comprise an input layer 1210, hidden layers 1220, 1230, 1240, and an output layer 1250. Each layer of the ANN 1200 may comprise one or more nodes, such as a node 1205 or a node 1215. In particular embodiments, each node of an ANN may be connected to another node of the ANN. As an example and not by way of limitation, each node of the input layer 1210 may be connected to one of more nodes of the hidden layer 1220. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 12 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 12 depicts a connection between each node of the input layer 1210 and each node of the hidden layer 1220, one or more nodes of the input layer 1210 may not be connected to one or more nodes of the hidden layer 1220.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1220 may comprise the output of one or more nodes of the input layer 1210. As another example and not by way of limitation, the input to each node of the output layer 1250 may comprise the output of one or more nodes of the hidden layer 1240. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1225 between the node 1205 and the node 1215 may have a weighting coefficient of 0.4, which may indicate that 0.4 multiplied by the output of the node 1205 is used as an input to the node 1215. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1200 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1004 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1000. A privacy setting may be specified for one or more edges 1006 or edge-types of the social graph 1000, or with respect to one or more nodes 1002, 1004 or node-types of the social graph 1000. The privacy settings applied to a particular edge 1006 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1004 connected to a user node 1002 of the first user by an edge 1006. The first user may specify privacy settings that apply to a particular edge 1006 connecting to the concept node 1004 of the object, or may specify privacy settings that apply to all edges 1006 connecting to the concept node 1004. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 13:
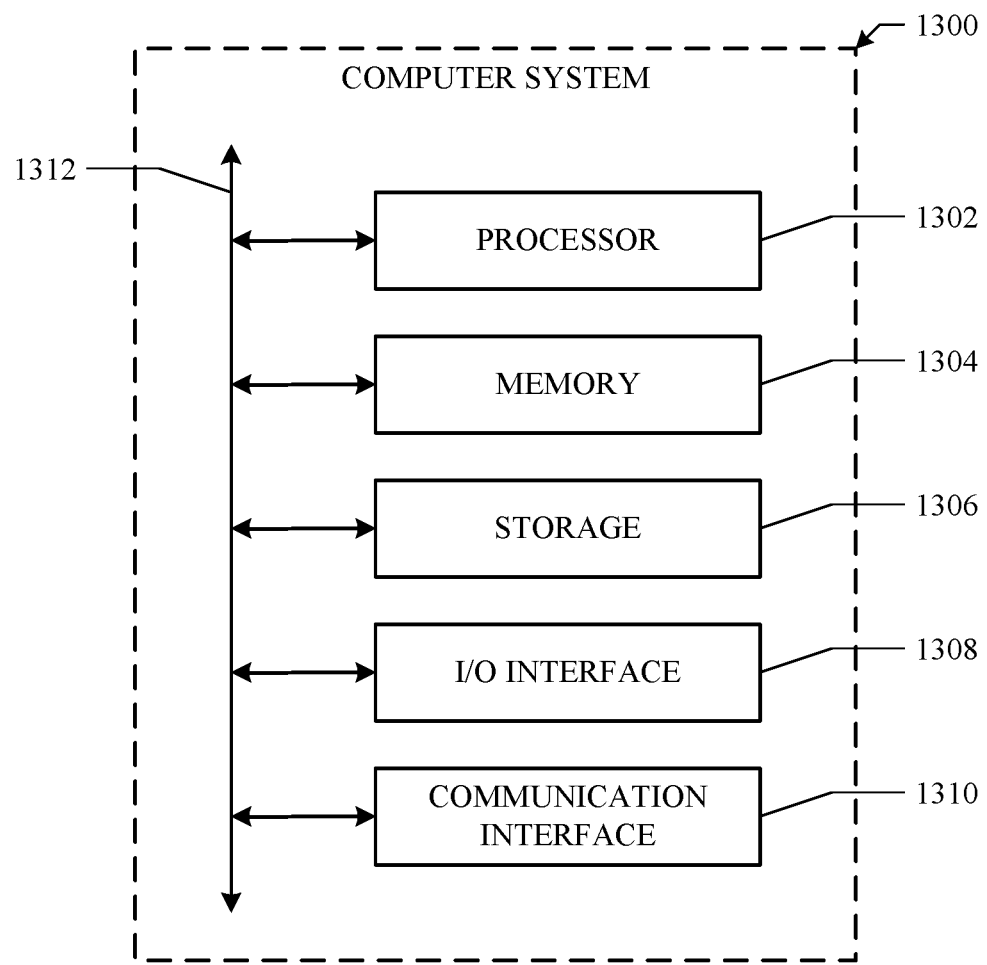
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an assistant system:
receiving, from a client system associated with a user via an assistant xbot associated with the assistant system, a query from the user;
determining, based on the query, one or more initial memory slots;
accessing a memory graph associated with the user, wherein the memory graph comprises a plurality of nodes and a plurality of edges connecting the nodes, and wherein one or more of the nodes correspond to one or more episodic memories of the user, respectively, and wherein each edge corresponds to a relationship between the connected nodes;
determining, by one or more machine-learning models based on the initial memory slots and dialog contexts associated with the query, one or more sequence paths of walk steps traversing the memory graph;
selecting, by the one or more machine-learning models based on the one or more sequence paths of walk steps, one or more candidate nodes from the memory graph;
generating a response based on the initial memory slots and episodic memories corresponding to the selected candidate nodes; and
sending, to the client system in response to the query via the assistant xbot, instructions for presenting the response.

2. The method of claim 1, wherein the one or more candidate nodes are selected from the one or more nodes corresponding to the one or more episodic memories of the user.

3. The method of claim 1, wherein one or more nodes of the plurality of nodes correspond to one or more entities, respectively.

4. The method of claim 1, wherein the memory graph is built based on a knowledge graph comprising a plurality of nodes corresponding to a plurality of entities, respectively.

5. The method of claim 4, wherein the plurality of nodes of the memory graph comprise:
a plurality of nodes corresponding to a plurality of entities from the knowledge graph; and
a plurality of nodes corresponding to a plurality of episodic memories of the user.

6. The method of claim 4, further comprising:
building a synthetic memory graph generator; and
generating, by the synthetic memory graph generator, one or more nodes in the memory graph, wherein each of the one or more nodes is connected to one or more entities associated with the knowledge graph.

7. The method of claim 1, wherein the query is associated with a context, and wherein selecting the one or more candidate nodes is further based on the context associated with the query.

8. The method of claim 1, wherein the one or more machine-learning models comprise at least a long-short term memory (LSTM) model.

9. The method of claim 1, further comprising:
determining relevance between the initial memory slots and each of the plurality of nodes in the memory graph, wherein selecting the one or more candidate nodes is further based on the relevance.

10. The method of claim 1, further comprising:
generating a query encoding for the query based on a long-short term memory (LSTM) model; and
generating a memory encoding for each node corresponding to an episodic memory in the memory graph based on one or more of a graph embeddings projection model or a LSTM model.

11. The method of claim 10, wherein selecting the one or more candidate nodes comprises inputting the generated query encoding and each generated memory encoding to the one or more machine-learning models, and wherein the one or more machine-learning models generate the one or more sequence paths of walk steps attending to the one or more candidate nodes within the memory graph.

12. The method of claim 11, further comprising:
inputting the generated query encoding, each generated memory encoding, and the one or more sequence paths of walk steps to the one or more machine-learning models, wherein the one or more machine-learning models generate one or more answer candidates, wherein the answer candidates are ranked in an order based a compatibility between the query and the respective answer candidate, and wherein the compatibility is determined by the one or more machine-learning models.

13. The method of claim 12, further comprising:
aggregating, by the one or more machine-learning models, the one or more answer candidates, wherein each answer candidate is associated with a weight, and wherein the weight is determined based on the rank associated with the respective answer candidate.

14. The method of claim 1, wherein generating the response is further based on one or more language templates.

15. The method of claim 1, wherein the response comprises one or more of a content file associated with the initial memory slots and episodic memories corresponding to the selected candidate nodes.

16. The method of claim 15, wherein the content file comprises one or more of textual content, an image, a video clip, or an audio clip.

17. The method of claim 15, wherein the response is presented in a user interface comprising one or more of a media section or a chat section, wherein the media section surfaces the image or video clip, and wherein the chat section surfaces the textual content.

18. The method of claim 1, wherein the episodic memories of the user are extracted from one or more of:
a plurality of content objects associated with the user;
social-networking information associated with the user;
contact information associated with the user;
calendar information associated with the user; or
interactions with one or more other users in an online social network.

19. One or more computer-readable non-transitory storage media embodying software that is operable when executed by an assistant system to:
receive, from a client system associated with a user via an assistant xbot associated with the assistant system, a query from the user;
determine, based on the query, one or more initial memory slots;
access a memory graph associated with the user, wherein the memory graph comprises a plurality of nodes and a plurality of edges connecting the nodes, and wherein one or more of the nodes correspond to one or more episodic memories of the user, respectively, and wherein each edge corresponds to a relationship between the connected nodes;
determine, by one or more machine-learning models based on the initial memory slots and dialog contexts associated with the query, one or more sequence paths of walk steps traversing the memory graph;
select, by the one or more machine-learning models based on the one or more sequence paths of walk steps, one or more candidate nodes from the memory graph;
generate a response based on the initial memory slots and episodic memories corresponding to the selected candidate nodes; and
send, to the client system in response to the query via the assistant xbot, instructions for presenting the response.

20. An assistant system comprising: one or more processors;
and a non-transitory memory coupled to the processors comprising instructions executable by the processors, the processors operable when executing the instructions to:
receive, from a client system associated with a user via an assistant xbot associated with the assistant system, a query from the user;
determine, based on the query, one or more initial memory slots;
access a memory graph associated with the user, wherein the memory graph comprises a plurality of nodes and a plurality of edges connecting the nodes, and wherein one or more of the nodes correspond to one or more episodic memories of the user, respectively, and wherein each edge corresponds to a relationship between the connected nodes;
determine, by one or more machine-learning models based on the initial memory slots and dialog contexts associated with the query, one or more sequence paths of walk steps traversing the memory graph;
select, by the one or more machine-learning models based on the one or more sequence paths of walk steps, one or more candidate nodes from the memory graph;
generate a response based on the initial memory slots and episodic memories corresponding to the selected candidate nodes; and
send, to the client system in response to the query via the assistant xbot, instructions for presenting the response.

* * * * *